(12) United States Patent
Norimatsu et al.

(10) Patent No.: US 7,664,161 B2
(45) Date of Patent: Feb. 16, 2010

(54) PULSE GENERATOR AND THE TRANSMITTER WITH A PULSE GENERATOR

(75) Inventors: Takayasu Norimatsu, Hachioji (JP); Ryosuke Fujiwara, Kokubunji (JP); Masaru Kokubo, Foster, CA (US); Akira Maeki, Kokubunji (JP)

(73) Assignee: Renesas Technology Corp., Tokyo (JP)

(*) Notice: Subject to any disclaimer, the term of this patent is extended or adjusted under 35 U.S.C. 154(b) by 745 days.

(21) Appl. No.: 11/334,573

(22) Filed: Jan. 19, 2006

(65) Prior Publication Data

US 2006/0197618 A1    Sep. 7, 2006

(30) Foreign Application Priority Data

Feb. 18, 2005  (JP)  ............................. 2005-042031

(51) Int. Cl.
*H04B 1/00* (2006.01)
(52) U.S. Cl. .................. 375/130; 375/135; 375/146; 375/238; 375/297
(58) Field of Classification Search ............... 375/130, 375/135, 146, 238, 297
See application file for complete search history.

(56) References Cited

U.S. PATENT DOCUMENTS

| | | | | |
|---|---|---|---|---|
| 6,952,456 | B1 * | 10/2005 | Aiello et al. | ............... 375/295 |
| 2004/0085108 | A1 * | 5/2004 | Murata et al. | ............... 327/158 |
| 2004/0087291 | A1 * | 5/2004 | Wada | ............... 455/216 |
| 2005/0100079 | A1 * | 5/2005 | Sanada et al. | ............... 375/141 |

FOREIGN PATENT DOCUMENTS

| | | |
|---|---|---|
| JP | 2003-535552 | 11/2003 |
| JP | 2004-241859 | 8/2004 |
| JP | 2004-241860 | 8/2004 |
| WO | WO 01/93441 A1 | 12/2001 |

* cited by examiner

*Primary Examiner*—Shuwang Liu
*Assistant Examiner*—Kabir A Timory
(74) *Attorney, Agent, or Firm*—Miles & Stockbridge P.C.

(57) ABSTRACT

A pulse generator for UWB transmission, lower power consumption, and suppression of LO leakage by nonuse of the LO signal. The pulse generator includes a clock generator (CLK) for giving clock of a predetermined period; a delay circuit (DLY) equipped with a function of controlling a delay time and for delaying the clock; a square-wave pulse generation circuit (SWPG) that receives information being spread by a spread code and modulates phases of square wave pulses that have a pulse width corresponding to a differential delay for one stage of the delay circuit; and an amplitude control unit (AMPC) that outputs an impulse sequence having the pulse width of the square wave in a predetermined amplitude and combines the impulses; and outputs pulses that have a predetermined envelope form.

7 Claims, 23 Drawing Sheets

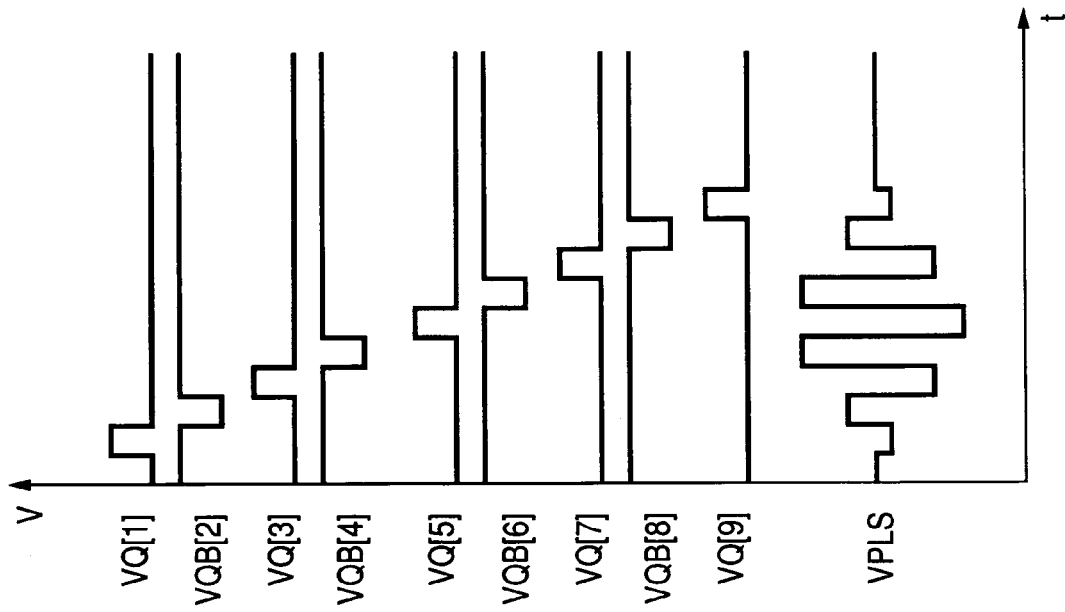
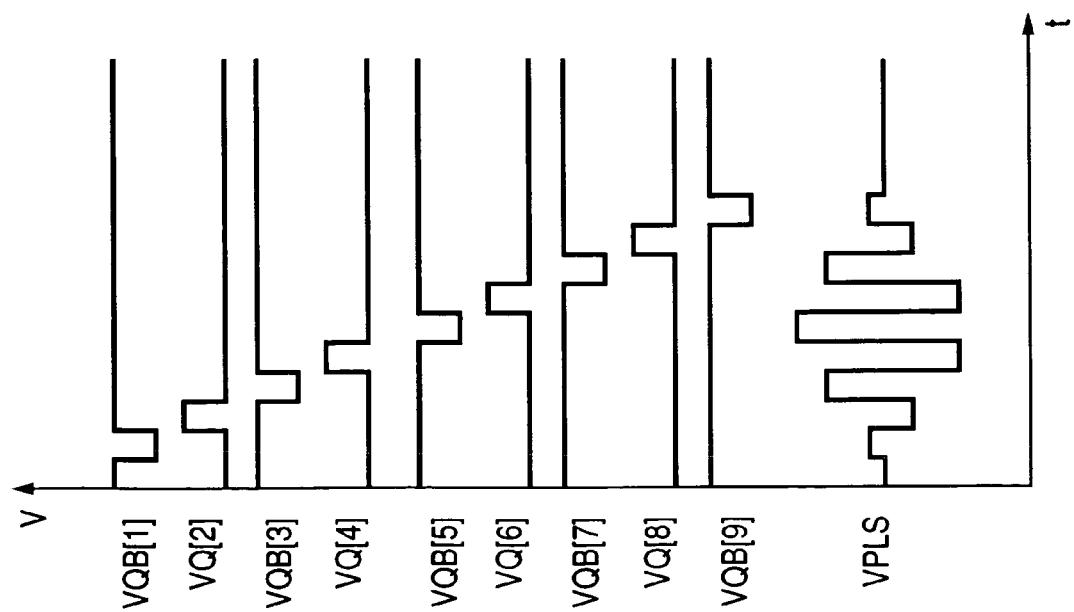

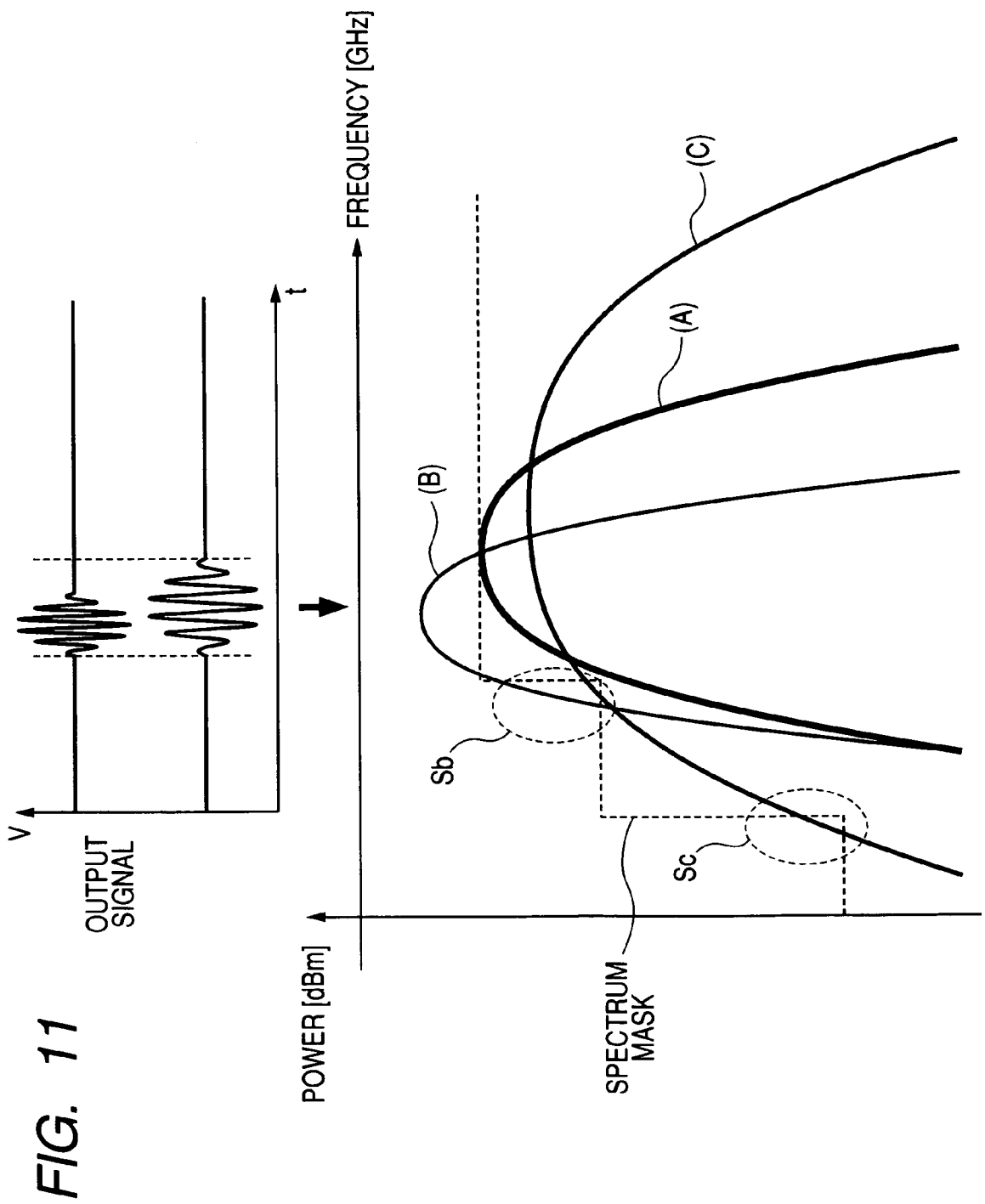

PULSE GENERATOR AND THE TRANSMITTER WITH A PULSE GENERATOR

CLAIM OF PRIORITY

The present application claims priority from Japanese application JP 2005-042031 filed on Feb. 18, 2005, the content of which is hereby incorporated by reference into this application.

FIELD OF THE INVENTION

This invention relates to a pulse generator for ultra wideband transmission that generates a waveform pulse for impulse radio communications, and a transmitter that uses it.

BACKGROUND OF THE INVENTION

Regarding the UWB-IR system, JP-A No. 241860/2004 and JP-A No. 241859/2004 disclose a pulse generator that is configured to obtain a pulse signal for transmission by synthesizing a mixer output of a signal of a local oscillator and a Gaussian pulse using the local oscillator and the mixer. Moreover, JP-A No. 241860/2004 also discloses a technique of generating a pulse shaped signal of a low frequency by assigning weights to output signals of a plurality of current sources.

Moreover, JP-A No. 535552/2003 discloses a transmitter that transmits information in a series of impulse waveforms and controls a form of the each impulse. FIG. 26 and FIG. 28 of JP-A No. 535552/2003 disclose a wavelet generation circuit that generates a square wave pulse whose pulse width is narrow from a differential delay using a plurality of lines each giving a different delay effect in order to generate a plurality of impulses.

SUMMARY OF THE INVENTION

The world aims at realization of a ubiquitous society in which devices surrounding people communicate with one another and every device is connected to a single network. In order for devices surrounding the people to communicate with one another, a short range wireless communication is enough. Because of this, it is conceivable that, if the ubiquitous society is realized, a market of WPAN (Wireless Personal Area Network) will be expanding. As one of communication systems intended for WPAN, the ultra wideband (UWB) system attracts much attention.

In the UWB system, since transmitted power is spread in a wideband, it is considered that its interference against other wireless device is slight. Moreover, since a wideband is used, a transmission speed is also fast.

In the UWB system, there exist the DS (Direct Spread) system, the MB-OFDM (Multi Band-Orthogonal Frequency Division Multiplexing) system, and the IR (Impulse Radio) system. Although the DS system and the MB-OFDM system feature fast transmission speed, high-speed operations are required; therefore, power consumption tends to increase. On the other hand, the IR system is slow in communication speed compared with the DS system and the MB-OFDM system, it transmits power intermittently. Therefore, it is a system that realizes lower power consumption and enables simplification of a circuit configuration. Accordingly, the UWB-IR system is promising in the ubiquitous society that aims at communication between devices, such as a wireless information device, that are required to be of lower power consumption.

Since the conventionally proposed pulse generator of the UWB-IR system requires a high voltage of about a few tens of volts and uses delay lines, it has problems: because delay lines are used, accuracy is low in an LSI (Large Scale Integrated Circuits), and it is difficult to realize an LSI using general purpose processes.

When the configuration of JP-A No. 241860/2004 or JP-A No. 241859/2004 is used, there are problems: because multiplication of the LO signal and the pulse is performed, LO leakage is caused, and because a large number of high-frequency circuits are used, power consumption cannot be suppressed. For example, as shown in FIG. 24, JP-A No. 241860/2004 discloses a pulse generator 102 that uses a local oscillator (LO) 205 and mixers (MIX) 206, 208 used in a general transmitter circuit and synthesizes these multiplication output to obtain a pulse signal for transmission. The clock generator 101 gives a clock signal of 4 GHz to the local oscillator (LO). In this pulse generator, the local oscillator (LO) transmits its output signal intermittently (for example, 2 ns), but the local oscillator and the mixer are always operating. Therefore, in a comparatively long non-signal interval (for example, 30 ns), an output of the local oscillator itself (local-oscillator (LO) times mixer (MIX 206)) will be transmitted as a leakage signal, causing spurious radiation within a signal band. Moreover, since the local oscillator and the two mixers are made to be always operating, power consumption cannot be suppressed.

On the other hand, with a configuration disclosed in FIG. 3 and FIG. 28 of JP-A No. 535552/2003, a plurality of narrow-pulse-width square wave pulses generated using a plurality of delay lines each having different delay effect are made to pass through a further delay line to obtain a plurality of narrow-pulse-width square wave pulses, these square wave pulses are added to generate a wavelet, and a positive or negative wavelet pulse in response to a modulation code is outputted as an output signal. However, when considering that a transmitter is fabricated in an LSI, decrease in accuracy of an output signal waveform cannot be avoided because of a larger influence of waveform deformation that is caused by further delaying a narrow-pulse-width square wave pulse at the second stage delay line and adding outputs of the different delay lines. That is, with the configuration of JP-A No. 535552/2003, there is considered a problem that a high-accuracy frequency characteristic is hard to obtain because of widened pulse width of the output signal, because of deformation of the outputted signal, and because of variation of the frequency characteristic itself.

The object of this invention is to provide a pulse generator for UWB transmission that solves problems of simplification of configuration, lower power consumption, and suppression of LO leakage, and a transmitter that uses it.

Another object of this invention is to provider a pulse generator for UWB transmission that can generate an output of a high-accuracy frequency characteristic, and a transmitter that uses it.

One of typical features of this invention lies in a pulse generator for a transmitter of the following configuration.

That is, a pulse generator of this invention is a pulse generator for a transmitter performing impulse communication, comprising: a reference clock generation unit for generating a reference clock; a delay unit equipped with a function of controlling a delay time and for generating a plurality of delayed signals having predetermined differential delays sequentially based on the reference clock; a square-wave pulse generation unit that outputs a plurality of square wave pulses whose pulse widths correspond to the differential delays and whose phases are modulated by information being spread by a spread code based on the respective delayed signals; and an amplitude control unit that assigns weights to the respective square wave pulses to convert them into a plurality of impulses and combines the impulses.

According to this invention, there is provided a pulse generator for UWB transmission capable of generating an output of a high-accuracy frequency characteristic, and a transmitter that uses it.

BRIEF DESCRIPTION OF THE DRAWINGS

FIG. 9 is a diagram showing an output of the square-wave pulse generation circuit that is a sub-circuit of the pulse generation circuit when a baseband signal fed thereto is High;

FIG. 10 is a diagram showing an output of the square-wave pulse generation circuit that is the sub-circuit of the pulse generation circuit when the baseband signal fed thereto is Low;

FIG. 11 is a diagram explaining an effect of the pulse generator according to the first embodiment of this invention;

DETAILED DESCRIPTION OF THE PREFERRED EMBODIMENTS

Hereafter, an embodiment of this invention will be described in detail with reference to drawings.

Figure 1:
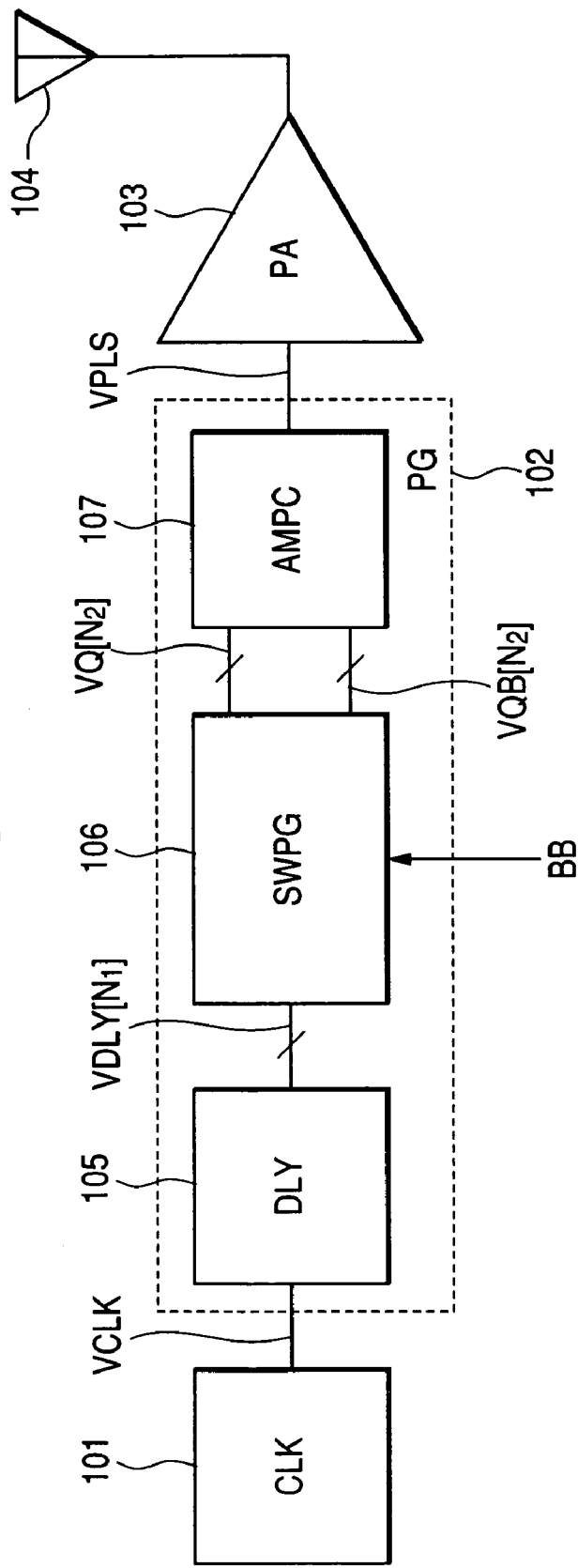
FIG. 1 is a diagram showing a whole configuration of a transmitter that uses a pulse generator according to an embodiment of this invention.
Figure 2A:
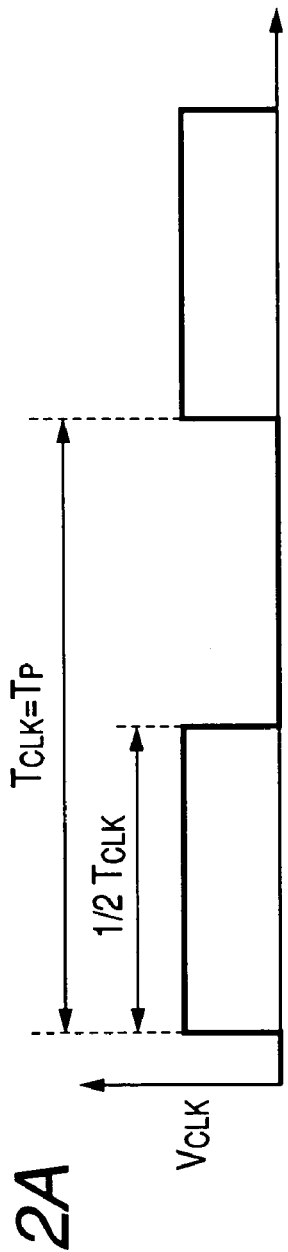
FIG. 2A is a diagram showing a reference clock (CLK) in this embodiment.
Figure 2B:
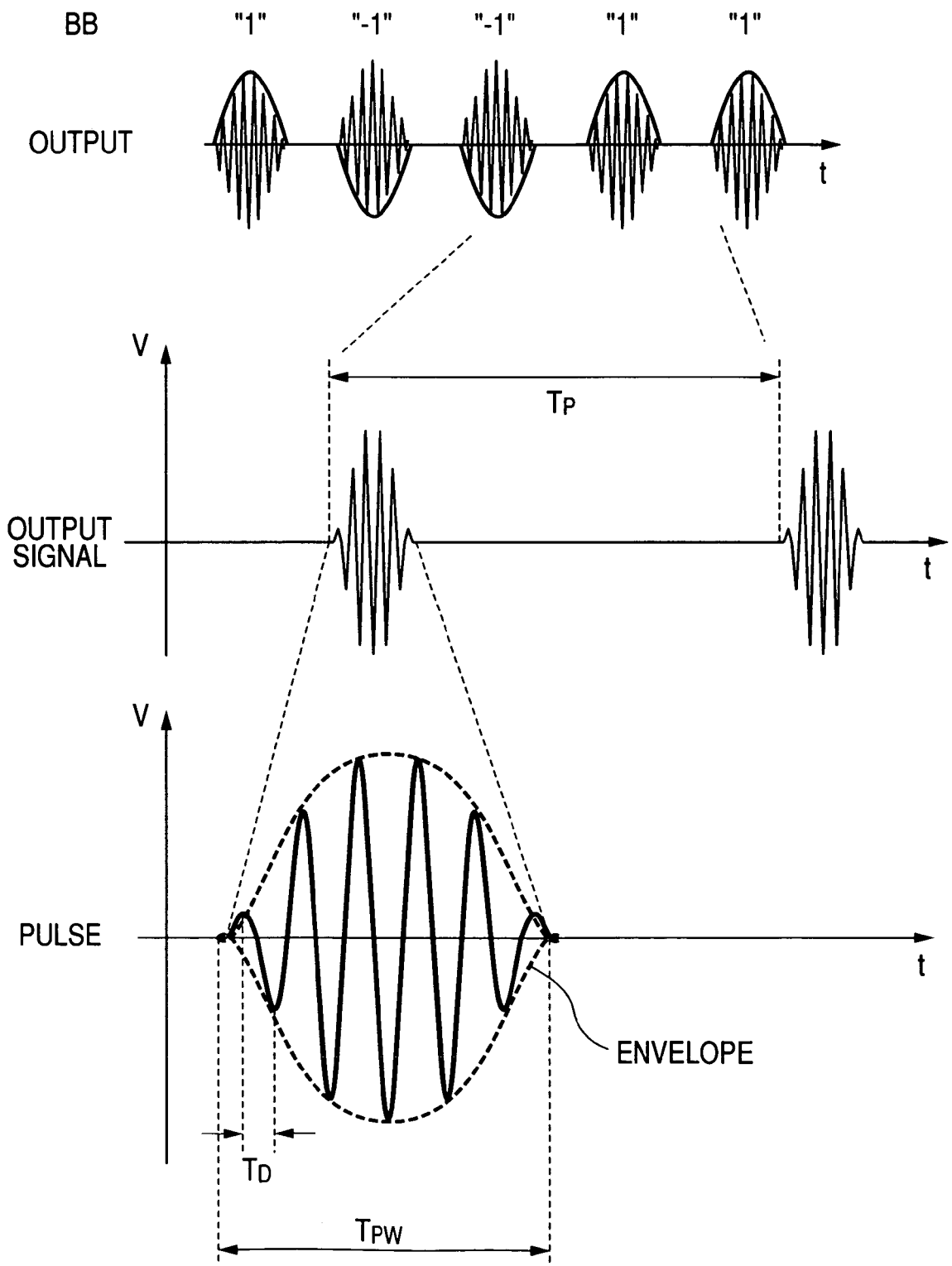
FIG. 2B is a diagram showing an impulse signal sequence and its individual impulse signal in this embodiment.
Figure 3:
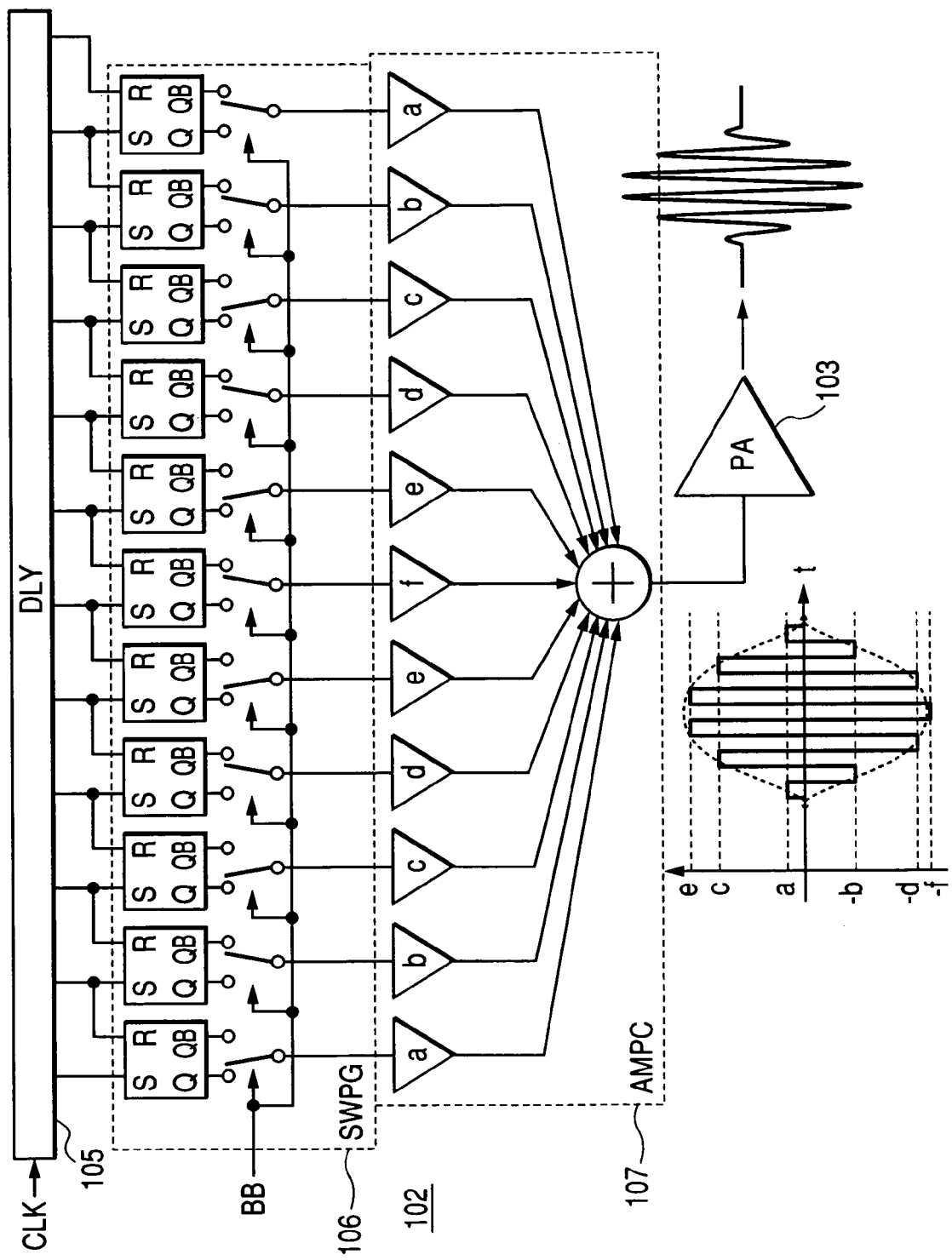
FIG. 3 is a diagram showing an example of configuration of the pulse generator of FIG. 1.

First, a whole outline of a transmitter having a pulse generator according to the embodiment of this invention in FIGS. 1-3, especially focusing on its configuration and operations.

FIG. 1 shows a block configuration of a transmitter having a pulse generator according to the embodiment of this invention. FIGS. 2A and 2B are diagrams showing a relation between the period of a reference clock (CLK) and an impulse signal sequence in this embodiment; FIG. 2A shows a waveform of the reference clock (CLK), and FIG. 2B shows the impulse signal sequence and its individual impulse signal. FIG. 3 shows an example of a whole configuration of the pulse generator 102 of FIG. 1.

As shown in the figure, the transmitter comprises the reference clock generation unit (clock generator) 101 for giving a reference clock (CLK) of a predetermined period, the pulse generator 102, a power amplifier (PA) 103, and an antenna 104.

The pulse generator 102 is constructed with: a delay unit (delay circuit=DLY) 105 for generating a plurality of delayed signals having different delay times by delaying the reference clock (CLK): a square-wave pulse generation unit (square-wave pulse generation circuit=SWPG) 106 for outputting a plurality of square wave pulses having a polarity corresponding to the respective transmission information from the plurality of delayed signals and a base band signal (BB); and an amplitude control unit (AMPC) 107 that generates a plurality of impulses having different amplitudes by assigning predetermined weights to the respective square wave pulses and generates an impulse signal, or an output voltage VPLS, composed of a series of impulse waveforms each of which is a combination of these impulses.

The clock generator 101 has a role of giving a reference clock to the pulse generator 102.

As shown in FIG. 2, an output signal of the transmitter is made up of an impulse signal sequence in which a series of impulse signals that are modulated based on a baseband signal (BB), for example, (1, −1, −1, 1), for each impulse interval TP are arranged. Each impulse signal contains a plurality of impulses whose wave heights are demarcated by a predetermined envelope, for example, a Gaussian waveform, and its phase differs from one another by 180° depending on a positive or negative polarity of the baseband signal. Each impulse signal has a width TPW, and the individual impulse has a pulse width TD. Further, the period of the reference clock Tclk is equal to an impulse interval TP.

Although the clock generator 101 usually consists of a crystal transmitter having an oscillation frequency of a low frequency, the clock generator 101 is not limited to the crystal transmitter. Any circuit can do as far as it can provide a desired low-frequency clock, for example, 32 MHz, to a delay circuit 105. For example, a combination of a low-frequency transmitter and a frequency divider can be used.

The delay circuit (DLY) 105 has plural stages of delay elements, and generates a plurality of delayed signals VDLY [N1] whose phases are different from one another. As an example, the pulse width TD of each impulse is equal to the differential delay Td at each stage. FIG. 3 shows an example of a case where the delay circuits are of 11 stages, and in this case, the width TPW of the impulse signal becomes TD×11.

Here, a relation between the pulse width TD of each impulse and the differential delay Td may be as defined by TD=N×Td (N: integer). For example, the pulse width of the individual impulse may be twice the differential delay, and thereby the impulse may be a continuous flow of positive and negative currents with the both currents having the differential delay to each other.

The square-wave pulse generation unit (square-wave pulse generation circuit=SWPG) 106, by receiving information being spread by a spread code, modulates phases of square wave pulses that have a pulse width corresponding to the differential delay for one stage of the delay circuit by comparing the signals outputted from the delay circuit and having different delay times, and outputs the square wave pulses. That is, the unit 106 outputs a plurality of square wave pulses VQ [N2] or VQB(s) that have both a pulse width comparable to the differential delay between adjacent delayed signals VDLY [N1] and a polarity given by the baseband signal (BB).

The amplitude control unit (AMPC) 107 receives a square wave pulse sequence outputted from the square wave pulse generation circuit at different timings, and thereby outputs an impulse sequence having a pulse width of the square wave in a predetermined amplitude, and combines the impulse sequence. That is, the unit 106 generates a plurality of impulses each having a different amplitude by assigning predetermined weights to the plurality of square wave pulses VQ [N2] or VQB(s) [N2], combines these plurality of impulses, and thereby generates an impulse signal sequence composed of a series of impulse waveforms that are demarcated by a predetermined envelope form as an output signal VPLS for transmission.

The amplitude control unit (AMPC) 107 can generates a series of impulse waveforms having a predetermined envelope form by assigning weights of a times, b times, c times, d times, e times, f times, e times, d times, c times, b times, and a times (0<a<b<c<d<e<f) to square wave pulses at each stage.

Hereafter a more concrete embodiment of the pulse generator of this invention will be described.

First Embodiment

Figure 4:
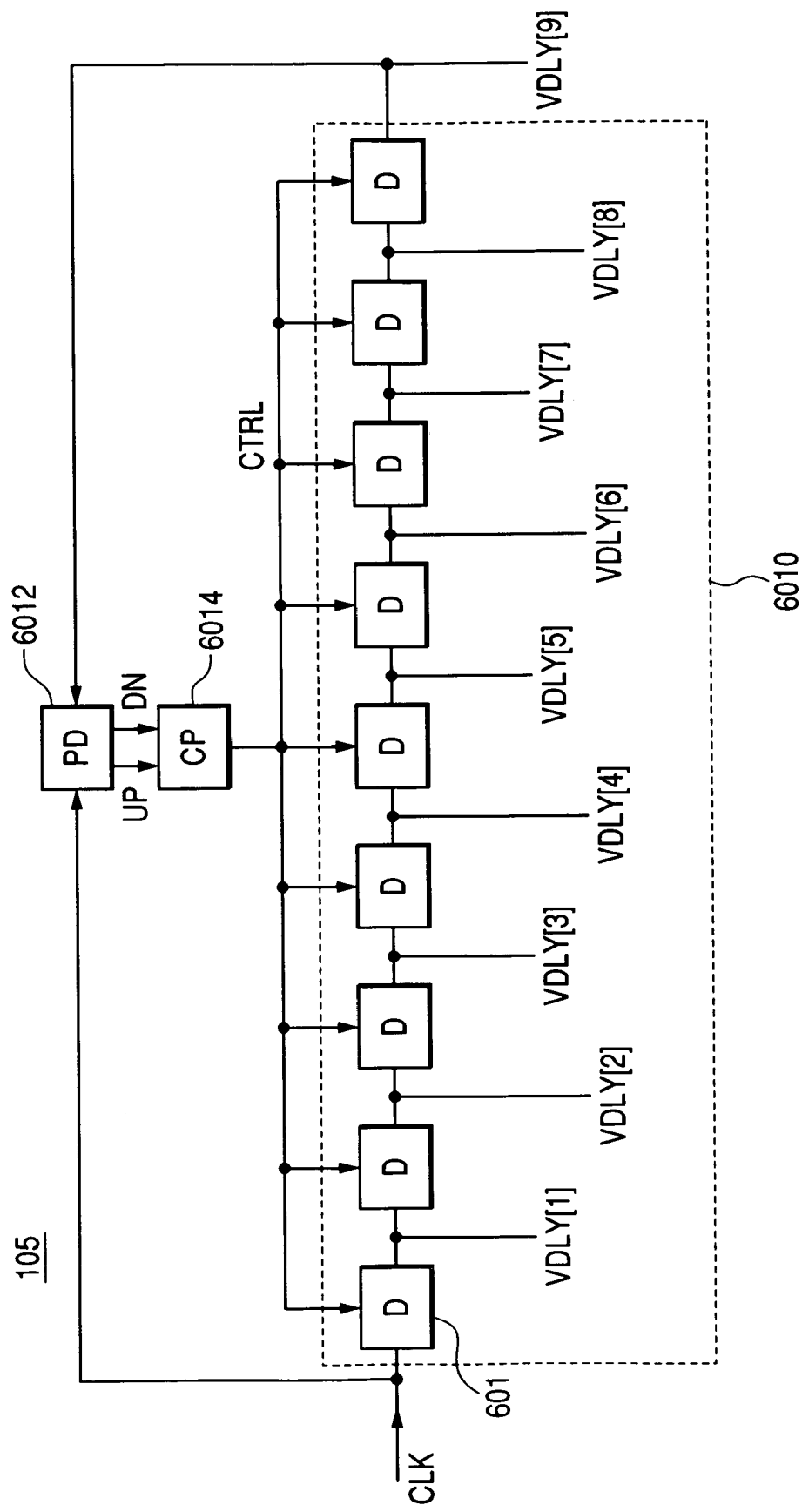
FIG. 4 is a block diagram of a delay circuit of the pulse generator according to the first embodiment of this invention.

FIG. 4 shows details of the delay circuit 105 of a pulse generator that is a first embodiment of this invention. The delay circuit 105 consists of a plurality of delay elements provided in series, and has a function of delaying an inputted signal over a plurality of stages, each stage delaying the signal by a delay time Td. In the following example, an example whose delay circuits are of nine stages is shown.

In order to improve the accuracy of delay, it is preferable for the delay circuit 105 to adopt a DDL (Delay Locked Loop) consisting of: a delay array 6010 composed of delay elements 601 each of which is capable of controlling a delay time, such as an inverter, being connected to one another and arranged in a plurality of stages; a phase comparator (PD) 6012 that compares phases between the input clock and an output of the last-stage delay element and generates a square wave having a pulse width equal to a time of the phase difference; and a charge pump (CP) 6014 for converting the phase difference into a voltage. The DLL compares phases between the output and the input of the delay element with the phase comparator 6012, and output a signals UP or DN indicating that the phase of the output is in advance of or behind the input. In response to the UP or DN signal, the charge pump 6014 controls the voltage to be larger or smaller, thereby controls the delay time Td of the each delay element 601, and fixes the delay time such that the phases of the input and the output are shifted by just one period. Accordingly, the delay circuit can output a delayed signal robust against variation.

Figure 5:
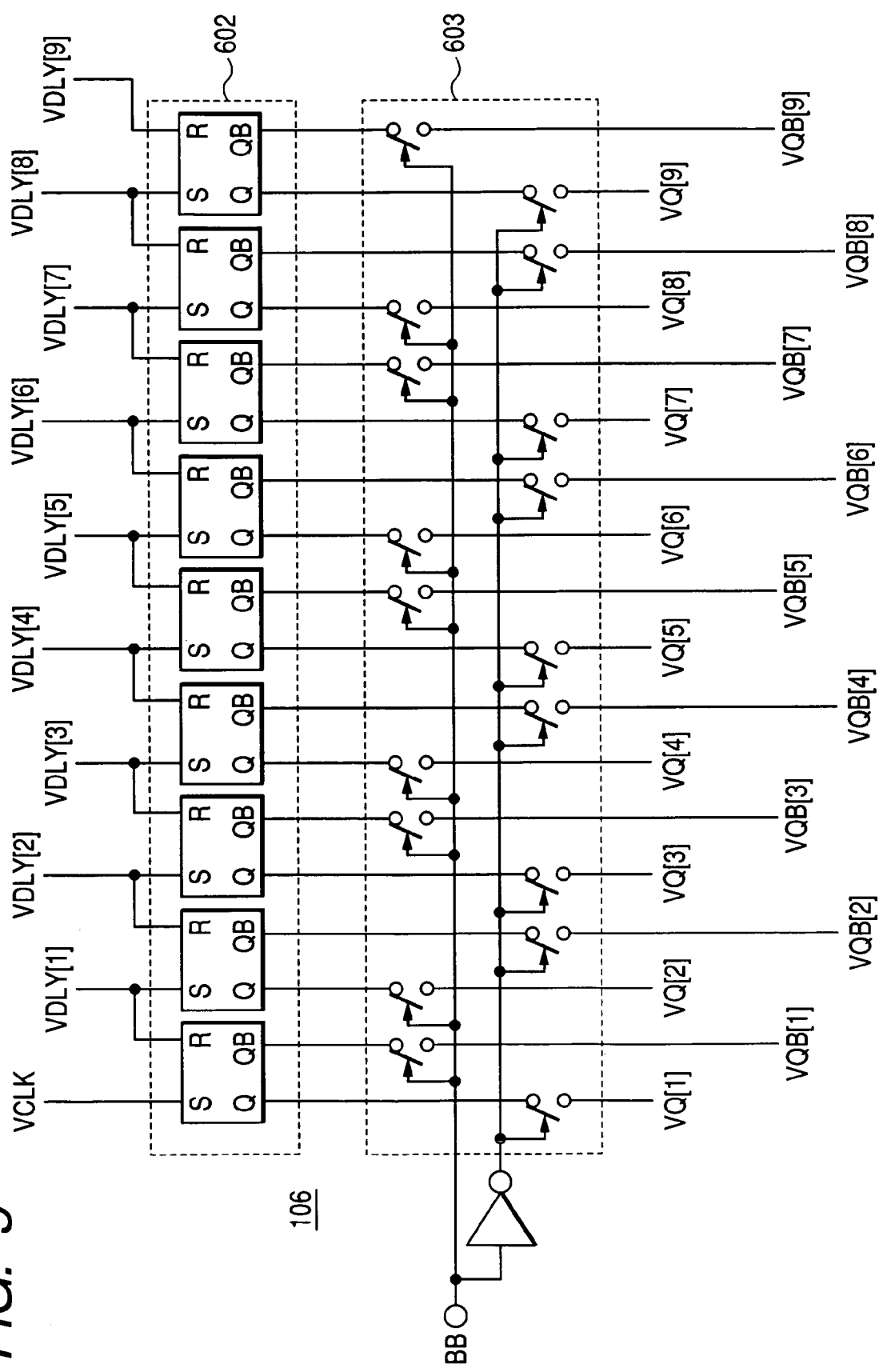
FIG. 5 is a block diagram of a square wave pulse generator included in the pulse generator according to the first embodiment of this invention.

FIG. 5 shows details of the square-wave pulse generation circuit 106 of FIG. 3. The square-wave pulse generation circuit 106 has functions of comparing a plurality of delayed clocks, generating a square wave having a pulse width equal to the differential delay, and controlling its polarity based on the baseband signal. The square-wave pulse generation circuit 106 consists of SR flip-flop's 602 and switches 603. In the SR flip-flop 602, when a setting signal rises, its output rises; when a reset signal rises, the output falls. The SR flip-flop 602 has two output different in polarity, i.e., a positive output and a negative output, and when the positive output rises by the setting signal, the negative output falls. The baseband signal BB is fed to the switch 603. When its input voltage is High, the switch 603 is turned ON; when the input voltage is Low, the switch 603 is interrupted.

The SR flip-flop 602 shown in FIG. 5 may be constructed with a logic circuit, such as an AND circuit, or may be constructed with a dynamic circuit for a high-speed operation. The switch 603 may use a logic circuit, such as an AND circuit, or a MOS (Metal Oxide Semiconductor) switch in order to control the outputs of the SR flip-flop.

Figure 6:
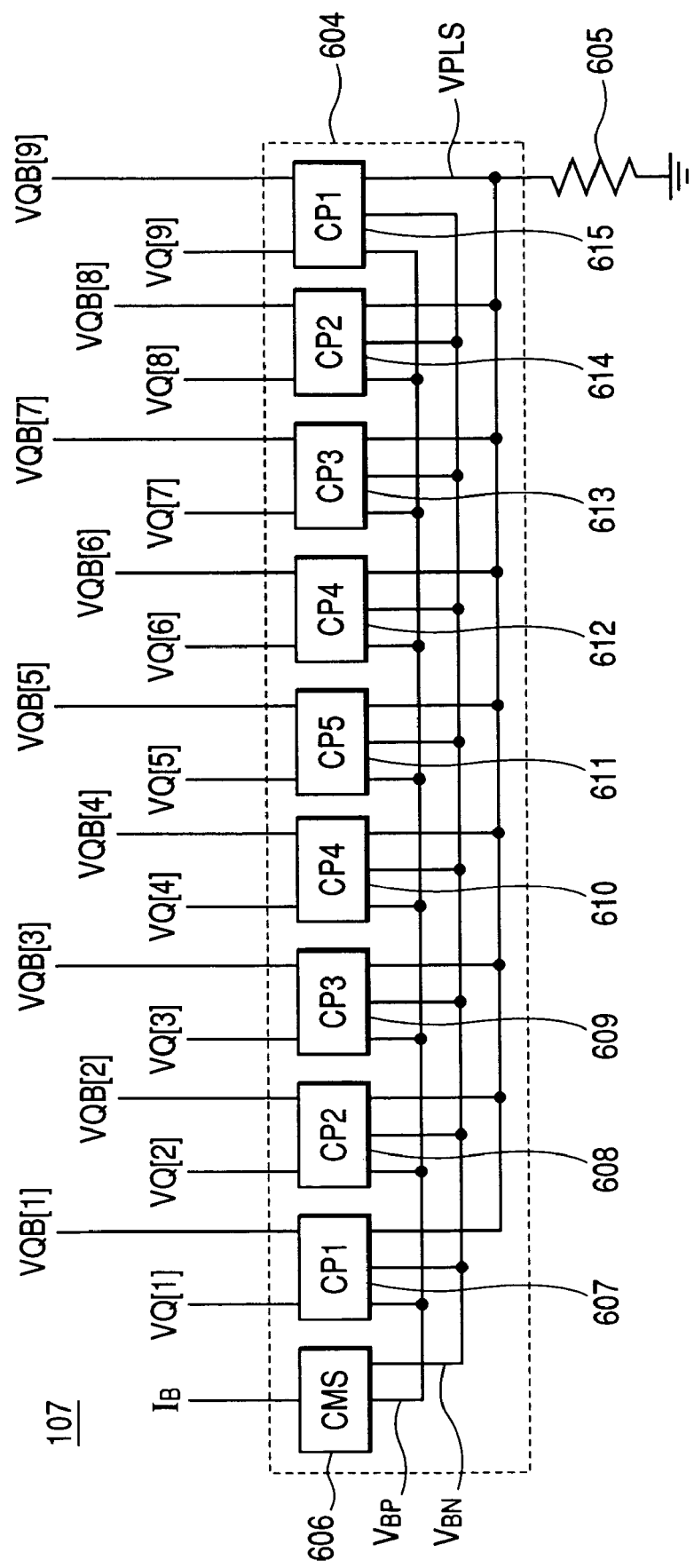
FIG. 6 is a block diagram of an amplitude control unit of the pulse generator according to the first embodiment of this invention.

FIG. 6 shows a block diagram of the amplitude control unit 107. A current source 604 consists of a bias voltage generation circuit 606 for generating bias voltages VBP, VBN by converting the input bias current IB into voltages, and current source elements 607-615 each of which receives the bias voltages and feeds a current according to the bias voltages VBP, VBN.

Figure 7:
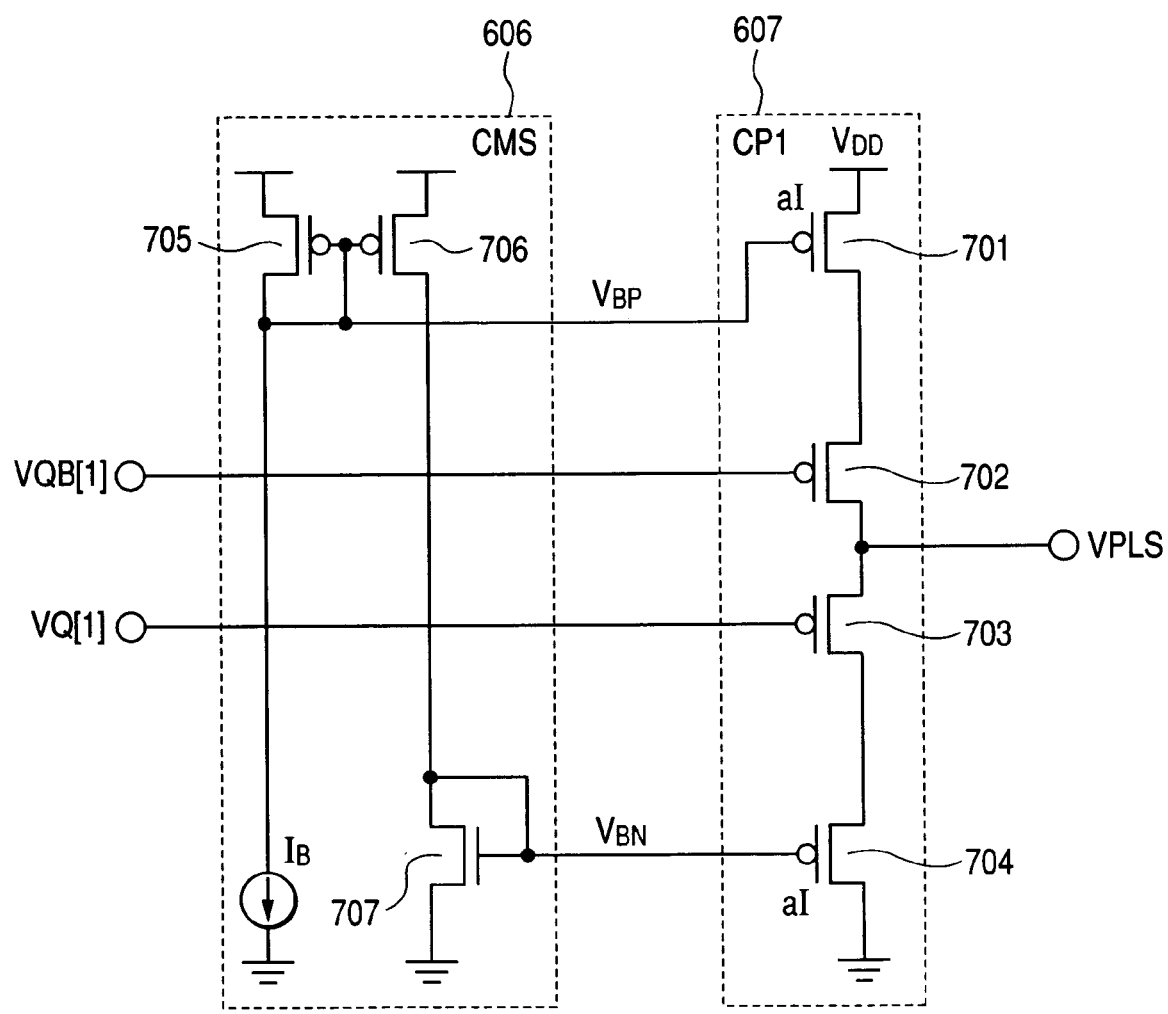
FIG. 7 is a circuit diagram of a current source that is a sub-circuit in FIG. 6.

FIG. 7 shows detailed circuit diagrams of the bias voltage generation circuit 606 and of the current source elements 607-615 of the amplitude control unit 107. As the current source elements 607-615 are different in gate width but the same in circuit configuration, the current source element 607 will be explained, being taken as an example.

In FIG. 7, the bias voltage generation circuit 606 feeds the current IB to a PMOS 705 in diode connection and flows the current by a current mirror circuit 706 into an NMOS 707 in diode connection. Accordingly, the bias voltage generation circuit 606 generates the bias voltages VBP, VBN of a current mirror circuit capable of flowing a current whose value is proportional to the input current IB.

In FIG. 7, the current source element 607 is constructed with a PMOS current mirror 701, a current controlling PMOS switch 702, an current controlling NMOS switch 703, and an NMOS current mirror 704.

The source of the PMOS current mirror 701 is connected to a power supply voltage VDD, the gate thereof is connected to the bias voltage VBP, and the drain thereof is connected to the source of the current controlling PMOS switch. The source of the NMOS current mirror 704 is connected to the ground, the gate thereof is connected to the bias voltage VBN, and the drain thereof is connected to the current controlling NMOS switch 703. The drain and the gate of the PMOS switch 702 is connected to the output and to the output of the square-wave pulse generation circuit 106, respectively, and the source thereof is connected to the drain of the PMOS current mirror 701. The drain and the gate of the current controlling NMOS switch 703 are connected to the output and to the output of the square-wave pulse generation circuit 106, respectively, and the source thereof is connected to the drain of the NMOS current mirror 704.

Output currents of the current source elements 607-615 are varied by varying the gate widths of the PMOS current mirror 701 and the NMOS current mirror 704.

The current controlling PMOS switch 702 controls the PMOS current mirror 701 so that a flow of the output current thereof into the load is controlled ON or OFF. Accordingly, the PMOS current mirror 701 is made to output a current only when the square wave pulse that is an output of the square-wave pulse generation circuit 106 is fed thereto. Similarly, the NMOS current mirror 703 controls the output current of the NMOS current mirror 704 and allows a current to output only when the square wave pulse is fed to the current controlling NMOS switch 703. Moreover, the current controlling PMOS switch 702 and the current controlling NMOS switch 703 controls the switch 603 with the baseband signal, as shown in FIG. 5, so that the square wave pulse is fed to either the PMOS switch 702 side or the NMOS switch 703 side, i.e., the PMOS switch 702 and the NMOS switch 703 are not turned conductive simultaneously.

The above is an explanation about the configuration of the first embodiment. Next, its operations will be explained based on signals of the parts in the first embodiment.

Figure 8:
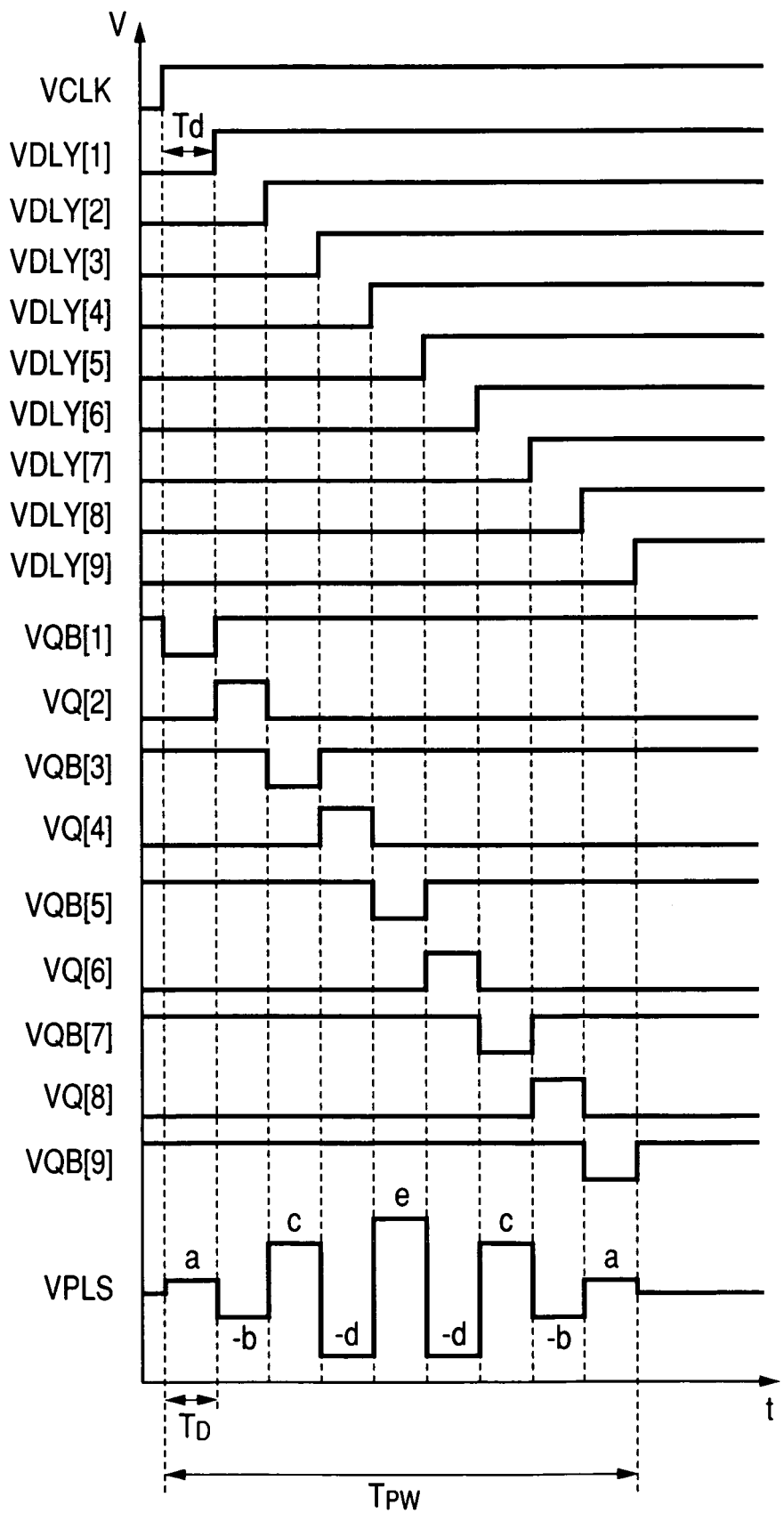
FIG. 8 is a diagram showing a timing chart of an output of each block of the pulse generator according to the first embodiment of this invention.

First, FIG. 8 shows a temporal waveform of an output of each part in the first embodiment of this invention. In FIG. 8, the horizontal axis represents time (t) and the vertical axis represents voltage (V). Further, an output voltage of the clock generator 101 is represented by VCLK; output voltages of the delay circuit 105 by VDLY [1 to 9]; output voltages of the square-wave pulse generation circuit 106 by VQB [1 to 9] and VQ [1 to 9]; and output voltages of the amplitude control unit 107 by VPLS [1 to 9].

As shown in FIG. 8, the delay circuit 105 outputs the output voltages VDLY [1 to 9] each of which is the output voltage VCLK of the clock generator 101 delayed by an integral multiple of the delay time Td.

The square-wave pulse generation circuit 106 detects the delay time Td, and outputs square waves VQB [1 to 9] and VQ [1 to 9] each of which has a pulse width TD equal to the delay time Td. For example, the differential delay between VCLK and VDLY [1] is detected and a signal shown in VQB [1] is outputted. At this time, when the square wave pulse shown in VQB [1] is outputted from the square-wave pulse generation circuit 106, a square wave pulse is not outputted to VQ [1]. Accordingly, the current controlling PMOS switch 702 and the current controlling NMOS switch 703 among the current source elements to which the square wave pulse are fed are not turned conductive simultaneously. As a result, either a positive or negative current flows into an output load 605 from each current source element.

Further, the amplitude control unit 107 sets the gate width of the PMOS current mirror 701 and the NMOS current mirror 704 among the current source element to a predetermined value, whereby a current value that each current source element fed to the output load is defined uniquely for each square wave pulse. By this setting, there can be generated an impulse current composed of the square wave pulses to which the respective weights are assigned, for example, VQB [1] multiplied by −a, VQ [2] multiplied by −b, VQB [3] multiplied by −c, VQ [4] multiplied by −d, VQB [5] multiplied by −e, VQ [6] multiplied by −d, VQB [7] multiplied by −c, VQ [8] multiplied by −b, and VQB [9] multiplied by −a (0<a<b<c<d<e). The above-mentioned impulse currents are flowed into the same load 605, and consequently a pulse VPLS that was amplitude-modulated is outputted, in FIG. 8. Here, by setting a, b, and c, to be proportional to an output voltage of a signal, for example a Gaussian waveform, when each impulse current becomes a maximum, a pulse signal having an envelope of the Gaussian waveform is generated.

FIG. 6 shows the output voltages of the square-wave pulse generation circuit 106 and of the amplitude control unit 107 when the baseband signal is set High (for example, power supply voltage). FIG. 10 shows output voltages of the square-wave pulse generation circuit 106 and of the amplitude control unit 107 when the baseband signal is set Low (for example, the ground voltage). In FIGS. 9 and 10, the horizontal axis represents time (t) and the vertical axis represents voltage (V). When the baseband signal is at High level (power supply voltage etc.), the square-wave pulse generation circuit 106 outputs a square wave pulse shown in FIG. 9; when the baseband signal is at Low level (ground voltage etc.), the square-wave pulse generation circuit 106 outputs a square wave pulse whose phase is different by 180° shown in FIG. 10. The input of the baseband signal determines the output of the square-wave pulse generation circuit 106, either a state shown in FIG. 9 where the output starts from a negative value and its polarity alternates between negative and positive or a state shown in FIG. 10 where the output starts from a positive value and its polarity alternates between positive and negative.

The number of the current source elements 607-615 and the number of the SR flip-flop's 602 are altered depending on the pulse width and pulse shape. FIGS. 4, 8, and 9 only show one case, and the numbers of the current source elements and of the SR flip-flop's can be altered freely depending on the number of the delay elements 601, the pulse width, and the pulse shape.

According to the first embodiment of this invention, the pulse generator 102 generates a plurality of square wave pulses having the same pulse width equal to the differential delay Td from a plurality of delayed square waves. At this time, the frequency of the clock outputted from the clock generator 101 is sufficiently low compared with a frequency of the output signal, and so parts that need to perform high-speed operations are the square-wave pulse generation circuit 106 and the amplitude control unit 107. However, since the square-wave pulse generation circuit 106 operates only during a time of the differential delay in the period of the output pulse, the operation time is short and consequently power consumption can be suppressed. Moreover, the square-wave pulse generation circuit 106 is configured not to include a circuit for continuously outputting a high-frequency signal that is included in a frequency band of an output signal, such as the LO signal, and accordingly unnecessary radiation in a signal band, such as the LO leakage, does not occur.

Although the amplitude alteration unit needs to perform high-speed operations and its power consumption is large, an operation time is the same as the operation time of the square-wave pulse generation circuit 106. Therefore, the operation time is short, and consequently the power consumption can be suppressed.

Moreover, since the delay circuit (DLY) 105 uses DLL's, it generates a plurality of square wave pulses whose delay times are controlled in a highly accurate manner by delaying the phase of the reference clock (CLK) accurately for every delay element at each stage of the plurality of stages. Accordingly, the phase at each stage is controlled accurately. Since the impulse is generated using the plurality of square wave pulses generated in this way, even when a transmitter is fabricated in an LSI, the waveform and the phase of the each impulse have high accuracy, and an output signal of a high-accuracy frequency characteristic as a whole is generated.

FIG. 11 compares pulse widths between the waveform of an output signal generated by the embodiment of this invention and the waveform of an output signal generated by the conventional example. The output signal generated by the embodiment of this invention is of a high-accuracy frequency characteristic, as shown by (A), such that accuracy of the waveform and the phase of the each impulse is high, the pulse width does not suffer deviation as a whole, and its spectrum is controlled to be located within a region of a spectrum mask.

On the other hand, in the conventional example where delay lines are arranged in two stages and outputs of different lines are added, distortion of the waveform becomes large and both the accuracy of the waveform and the phase of each impulse decrease. Because of this, the output signal comes with shifts, such as increased pulse width as shown in (B), a decreased pulse width as shown in (C), etc. Accordingly, the output signal tends to exist outside the region of the spectrum mask in Sb, Sc, etc., which results in nonconformity of (1) shift in the center frequency, (2) enlargement or reduction in a frequency range, (3) undulation of a peak value of the transmitted power, etc.

Figure 12:
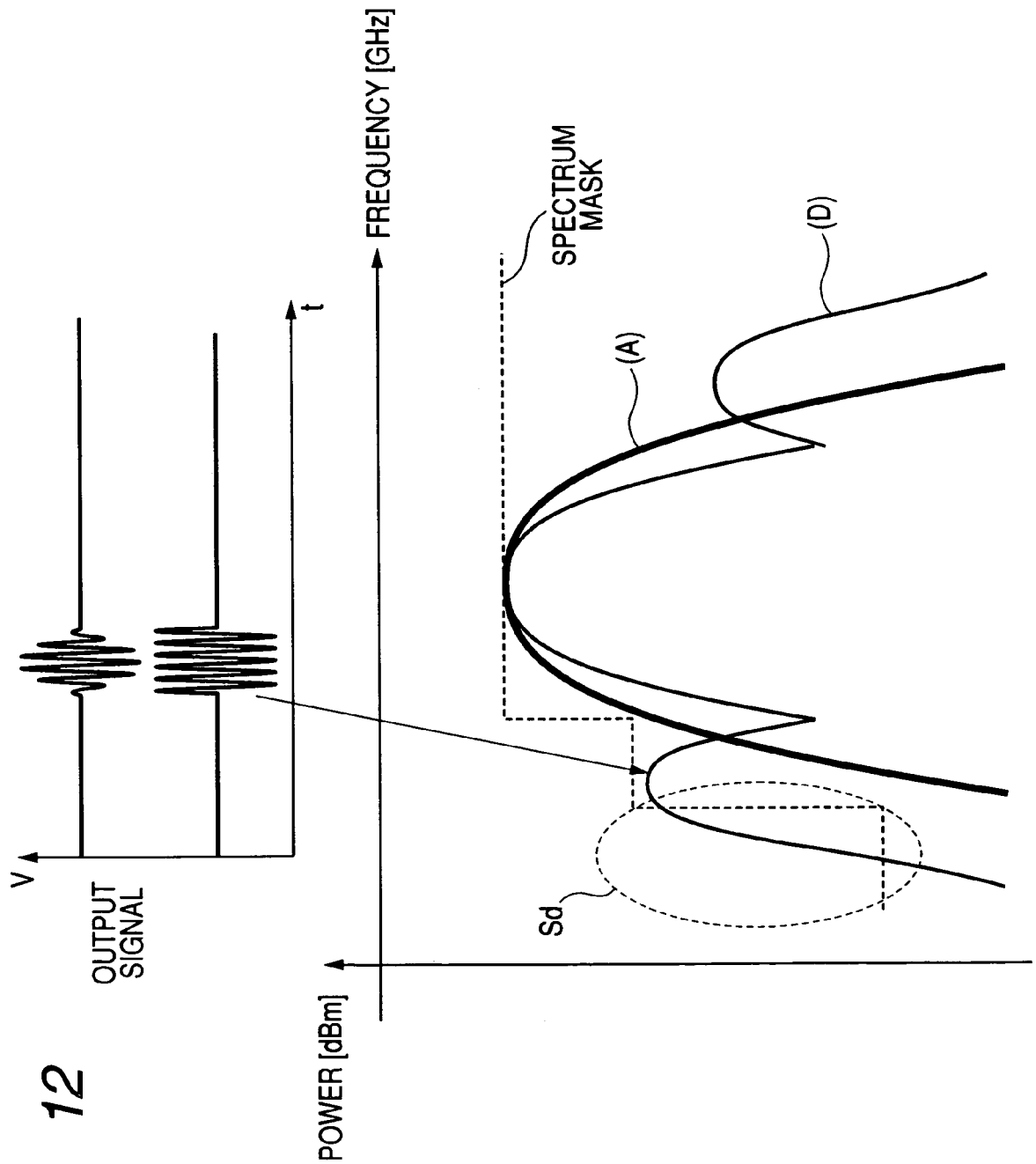
FIG. 12 is a diagram explaining an effect of the pulse generator according to the first embodiment of this invention.

FIG. 12 compares pulse shapes between the waveform of the output generated by the embodiment of this invention and the waveform of the output generated by the conventional example. The output signal generated by the embodiment of this invention is of a high-accuracy frequency characteristic, as shown by (A), such that accuracy of the waveform and the phase of the each impulse is high, the pulse shape does not suffer deformation as a whole, and its spectrum is controlled to be located within a region of a spectrum mask.

On the other hand, in the case where the delay line sets are arranged in two stages and connected in series, as the conventional example, and outputs of the different delay lines are added, distortion of the waveform becomes large and accuracy of the waveform and the phase of the each impulse decreases. This causes the output signal to result in deviations, such as alteration in the pulse shape as shown in (D), generation of fluctuation of the side lobes, inclination of the output signal to place outside a region of the spectrum mask at Sd, and narrowing of its pulse width. Accordingly, the conventional example gives rise to nonconformity of a varied frequency characteristic.

As just described, according to this embodiment, the pulse generator used in the UWB-IR system etc. can be operated intermittently, thereby being able to realize lower power consumption. Moreover, since the LO signal is not used, the problem of LO leakage is not caused. Furthermore, there is flexibility also in the shape of generated pulses and the pulse generator has versatility that enables it to be used in various scenes.

Furthermore, according to this embodiment, there can be provided a pulse generator for UWB transmission that generates an output signal of a high-accuracy frequency characteristic, and a transmitter that uses it.

Furthermore, according to this embodiment, the pulse generator is of a method for controlling outputs of the current source transistors by inputs to switches, and can obtain an arbitrary characteristic by changing the gate width; therefore, this embodiment can provide a pulse generator for UWB transmission and a transmitter that uses it.

Second Embodiment

A second embodiment of this invention will be described using FIGS. 13-16. In the second embodiment, the first embodiment shown in FIG. 1 is altered so as to have a differential configuration, and the load of the amplitude control unit is altered to a combination of a resistor and a capacitor.

Figure 13:
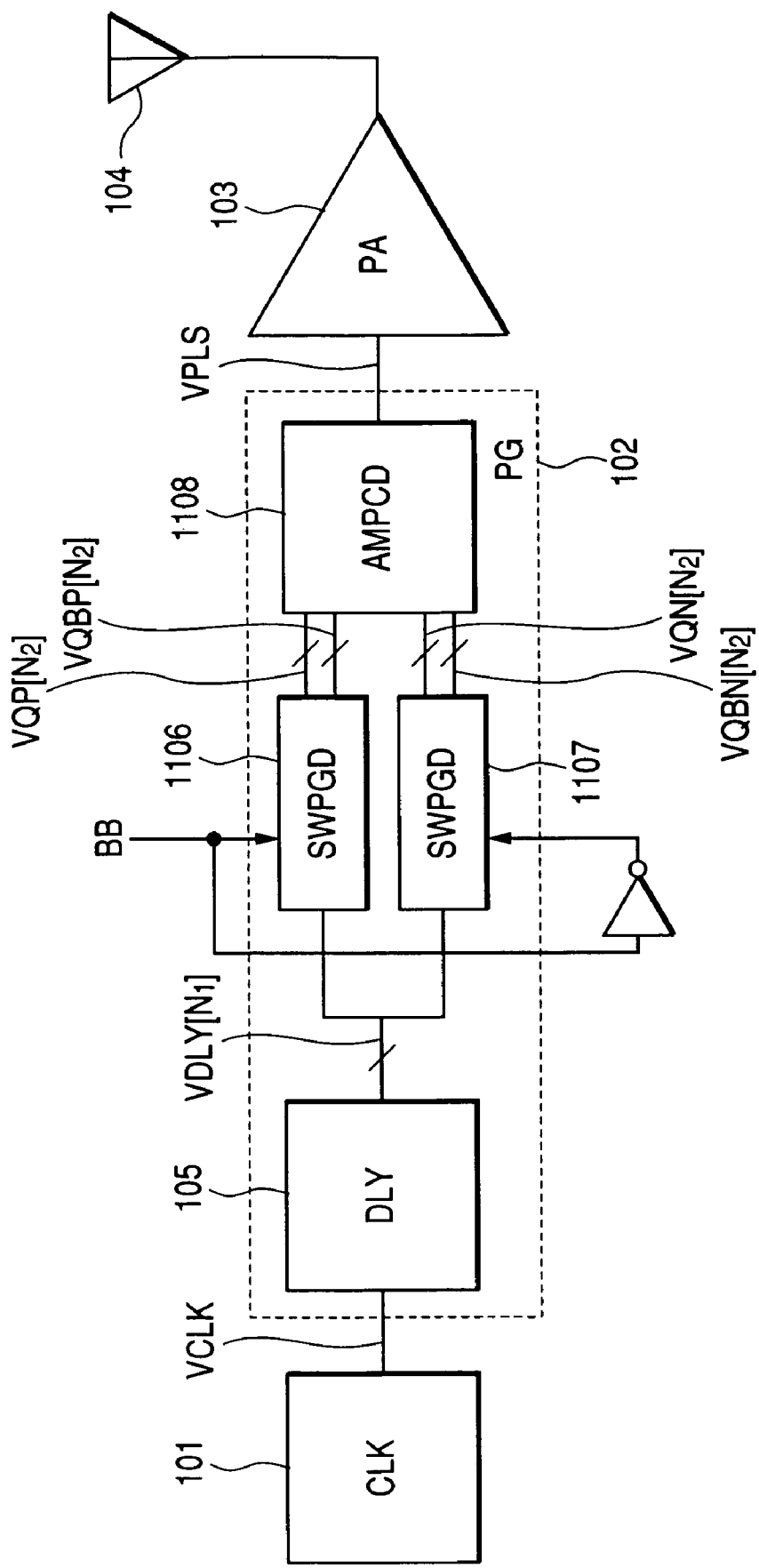
FIG. 13 is a diagram showing a transmitter using the pulse generator according to a second embodiment of this invention.

As shown in FIG. 13, a pulse generator is constructed with the delay circuit 105 for generating a plurality of signals having different delay times, two square-wave pulse generation circuits 1106 each of which controls an output pattern of a plurality of square wave pulses each having a pulse width comparable to its differential delay based on the baseband signal (BB) and outputs the pulses; and the amplitude control unit 107 for generating waveforms whose amplitudes are different depending on an input of the square wave pulse. A transmitter is constructed with the clock generator 101, the pulse generator 102, the power amplifier (PA) 103, and the antenna 104.

Next, a concrete structure of each constituent that constitutes the pulse generator will be described. Incidentally, since the clock generator 101 and the delay circuit 105 are the same as those in the first embodiment, their explanations are omitted.

Figure 14:
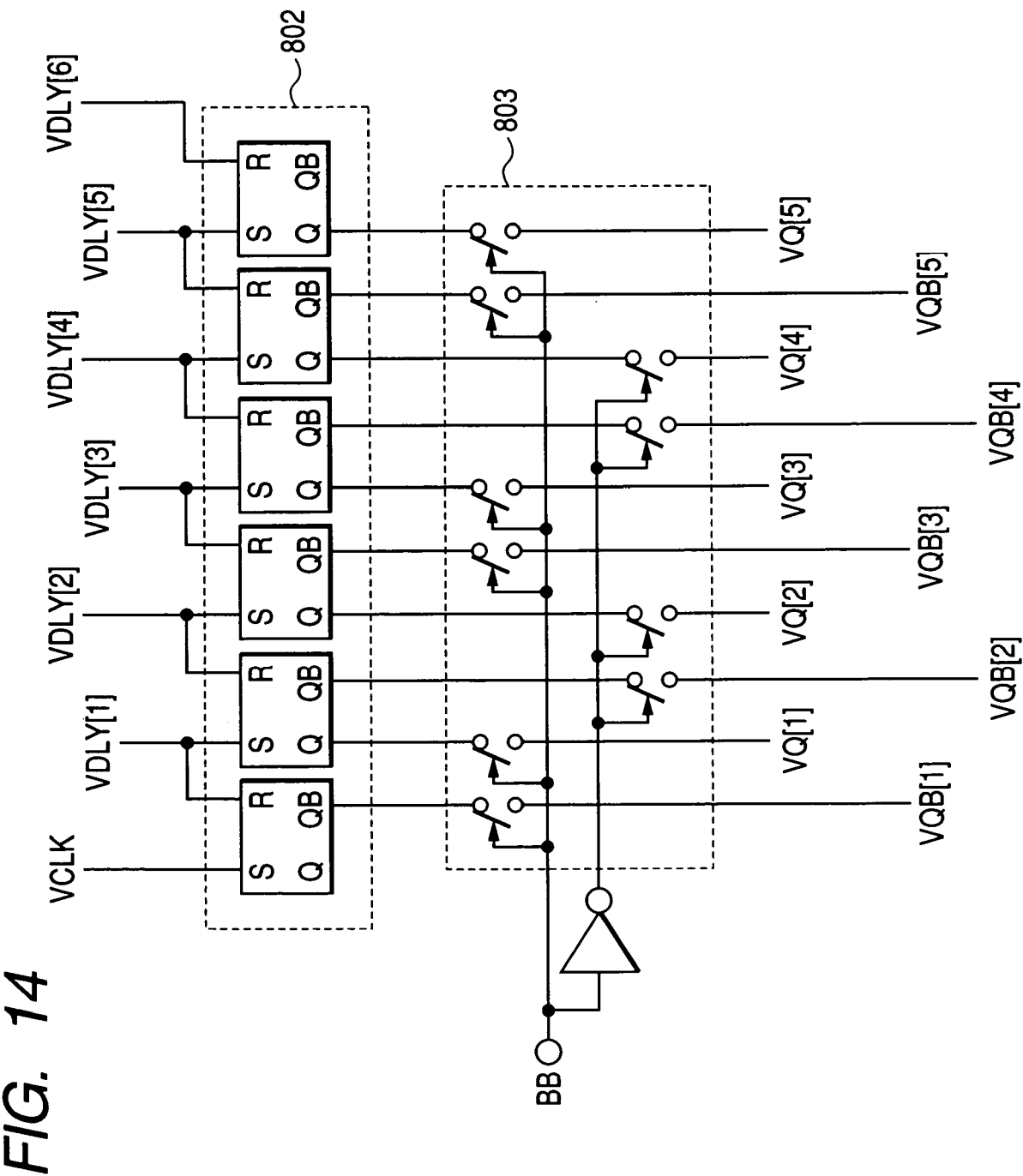
FIG. 14 is a block diagram of the square wave pulse generator that is a sub-circuit in FIG. 13.

FIG. 14 shows a block diagram of the square-wave pulse generation circuit 1106. In the following example, an example whose delay circuits are of six stages is shown. The square-wave pulse generation circuit 1106 has functions of comparing a plurality of delayed clocks, generating square waves each having a pulse width equal to the differential delay Td, and controlling the polarity based on the baseband signal. The square-wave pulse generation circuit 1106 consists of SR flip-flop's 802 and switches 803, as shown in FIG. 14. Unlike the first embodiment, a pulse is shifted by the delay time Td, and two outputs having opposite polarities (pulse width 2Td) are transferred to a current source element in the amplitude control unit as one pair.

Figure 15:
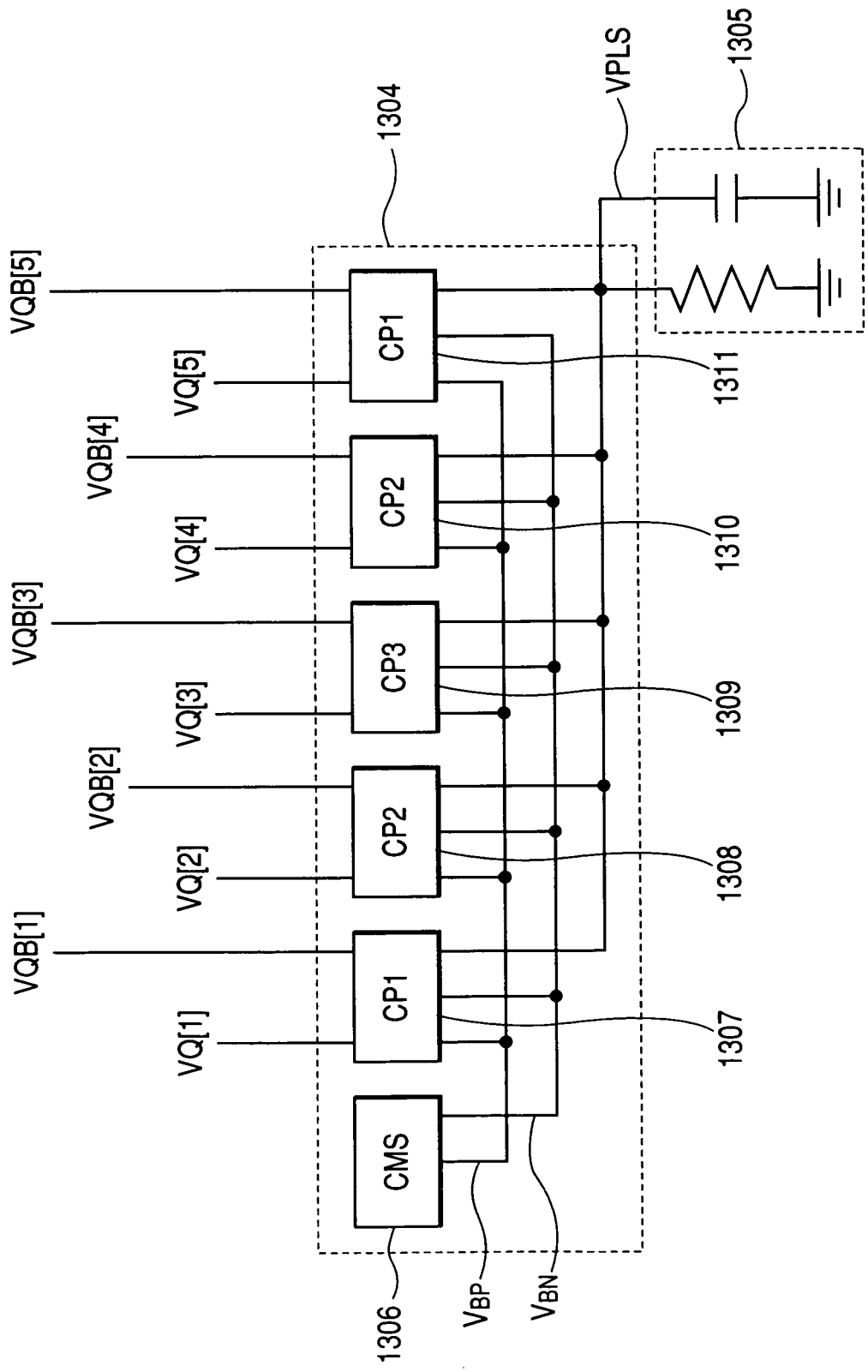
FIG. 15 is a block diagram of an amplitude control unit that is a sub-circuit in FIG. 13.

FIG. 15 shows a block diagram of the amplitude control unit 1108. The amplitude control unit consists of a current source 1304 and a load 1305. Unlike the first embodiment, the load is a circuit of a capacitor and a resistor connected in parallel. The current source 1304 consists of a bias voltage generation circuit 1306 that converts the input bias current to voltages, i.e., generating bias voltages VBP, VBN and current source elements 1307-1311 that receive the bias voltages and flow currents corresponding to the bias voltages VBP, VBN. Since a detailed circuit diagram of the current source elements 1307-1311 is the same as that of the first embodiment, their explanations are omitted.

The above is the explanation about the configuration of the second embodiment. Next, its operation will be explained based on a signal of each part in the second embodiment.

Figure 16:
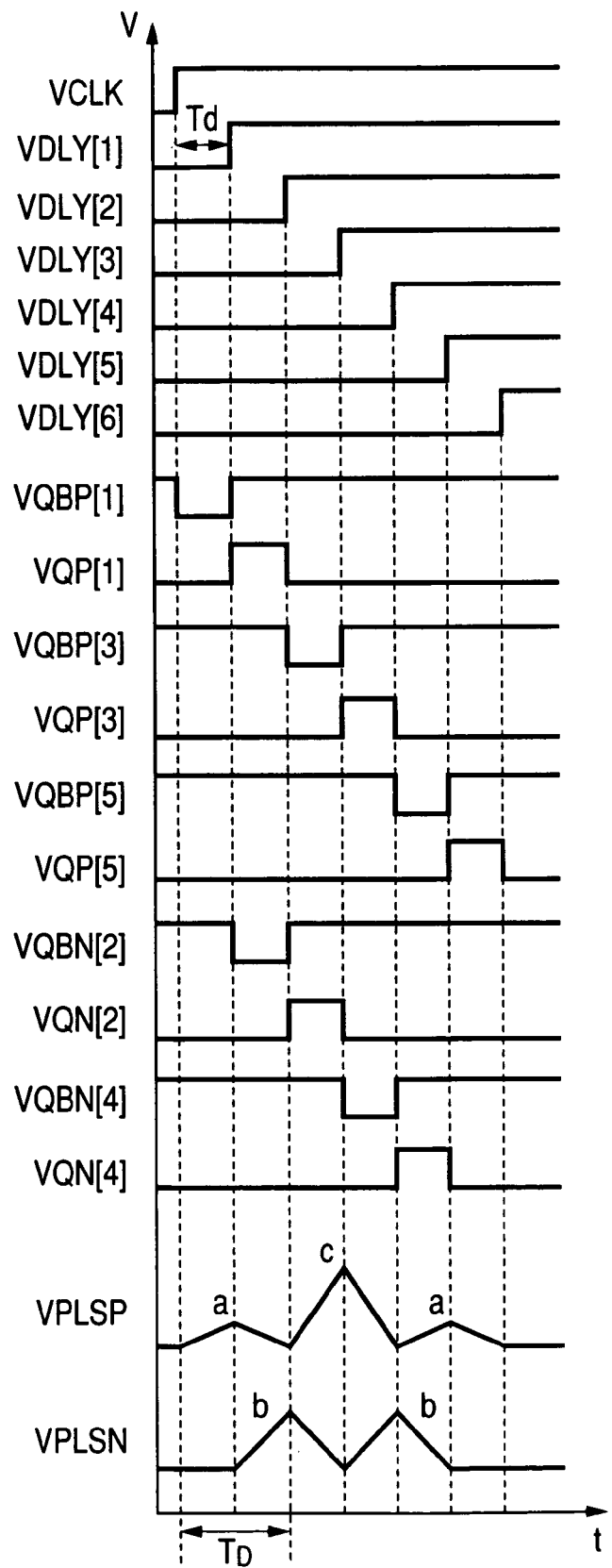
FIG. 16 is a diagram showing a timing chart of an output of each part of the pulse generation circuit according to the second embodiment of this invention.

FIG. 16 shows temporal waveforms for outputs of the parts in the second embodiment of this invention. In FIG. 16, the horizontal axis represents time (t), and the vertical axis represents voltage (V). An output voltage of the clock generator 101 is represented by VCLK; an output of the delay circuit 105 by VDLY [1 to 6]; an output voltage of the square-wave pulse generation circuit 1106 by VQBP [1 to 6]; VQP [1 to 6]; an output voltage of a square-wave pulse generation circuit 1107 by VQBN [1 to 6] and VQN [1 to 6]; and an output of an amplitude control unit 1108 by VPLS.

As shown in FIG. 16, the delay circuit 105 outputs an output voltage VDLY [1 to 6] that is an integral multiple of the output voltage VCLK of the clock generator 101. The square-wave pulse generation circuit 106 detects the delay time Td, and outputs the square waves VQBP [1 to 6], VQP [1 to 6], VQBN [1 to 6], and VQN [1 to 6] each of whose pulse widths becomes the delay time Td. For example, it detects the differential delay between VCLK and VDLY [1] and outputs a signal shown in VQBP [1]. At this time, for example, if the baseband signal is High, the square-wave pulse generation circuit 1106 outputs square wave pulses at VQBP [1], VQBP [3], VQBP [5], VQP [1], VQP [3], VQP [5], VQBN [2], VQBN [4], VQN [2], and VQN [4], and other voltages do not vary. Accordingly, the square wave pulse is fed to the current controlling PMOS switch 702 and the current controlling NMOS switch 703 both of which are in the same current source element with the differential delay Td between them and turns the MOS switches 702, 703 conductive, respectively. Therefore, the pulse generator repeats an operation that a positive current and a negative current from the each current source element flow in the output load 1305 continuously with the both currents having a delay Td to each other, which provides output voltages with a pulse width 2Td, i.e., as VPLSP and VPLSN.

Then, the amplitude control unit 107 sets up the gate width of the PMOS current mirror 701 and of the NMOS current mirror 704 in each current source element to a predetermined value, whereby current values that the current source elements flow into the output load are determined uniquely. For example, if gate widths of the current mirrors in the current source elements 1307-1311 are set as a:b:c:b:a, pulses that were amplitude-modulated are outputted, as for output voltages PLSP and PLSN of the pulse generator shown in FIG. 16. Here, by setting a, b, and c proportional to the output voltage of a signal (e.g., Gaussian waveform) when each impulse current becomes a maximum, pulse signals that have an envelope of a Gaussian waveform are generated. In order to operate in a differential manner, the rise of a signal is shifted between PLSP and PLSN by the differential delay Td, namely by a half of the period of the center frequency.

Moreover, the numbers of the current source elements 1307-1311, the SR flip-flop's 802 and of the switches 803 can be altered by altering the pulse width, the pulse shape, and the center frequency. This example shows only one case and the numbers of the current sources and the SR filip-flp's can be altered freely by the pulse width and the pulse shape.

According to this embodiment, the pulse generator used in the UWB-IR system etc. can be operated intermittently, thereby being able to realize lower power consumption. Moreover, since the LO signal is not used, the problem of LO leakage is not caused. Furthermore, there is flexibility also in the shape of generated pulses and the pulse generator has versatility that enables it to be used in various scenes.

Furthermore, according to this embodiment, there can be provided a pulse generator for UWB transmission that generates an output signal of a high-accuracy frequency characteristic, and a transmitter that uses it.

Furthermore, by the pulse generator adopting a differential configuration, it gives a capability of coping with a controlled amplitude of an output voltage resulting from a lower power supply voltage and an effect of suppressing a common mode signal.

Third Embodiment

A third embodiment is an example in which the current sources in the amplitude control unit in the first embodiment are altered to voltage sources.

Figure 17:
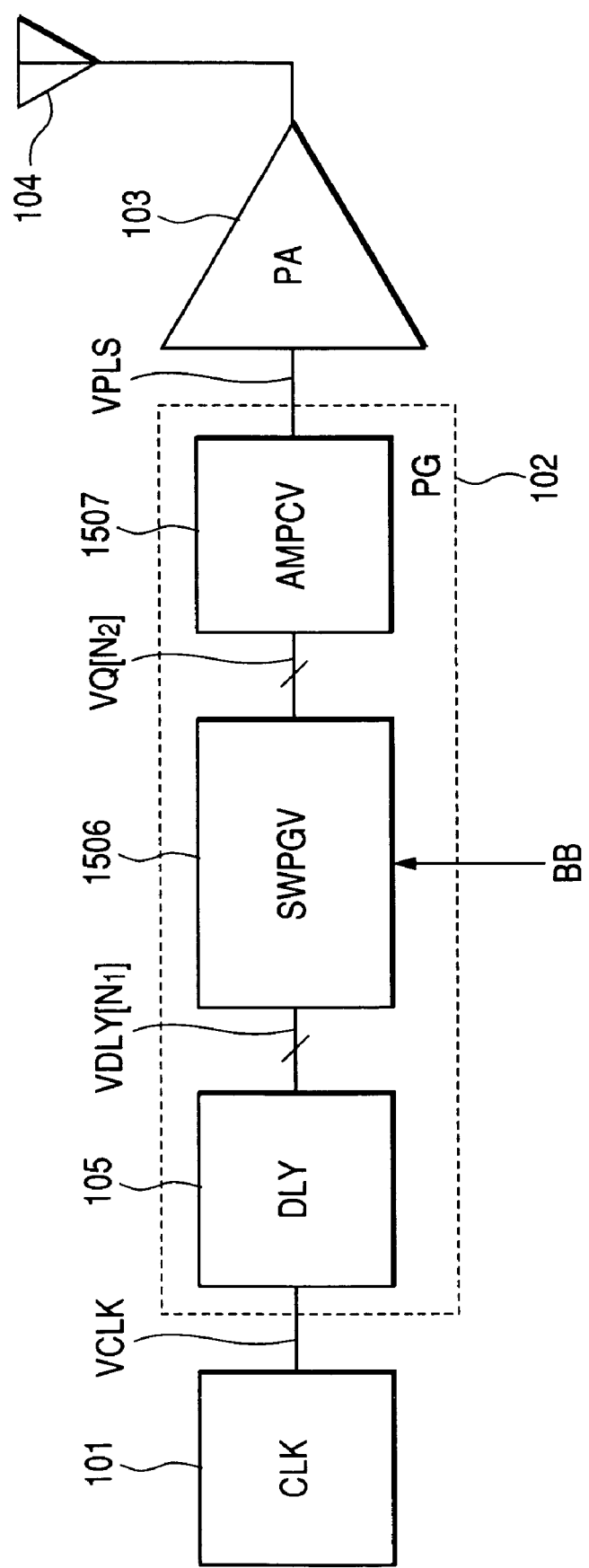
FIG. 17 is a diagram showing a transmitter using a pulse generator according to a third embodiment of this invention.

FIG. 17 shows a pulse generator according to a third embodiment this invention. The pulse generator of FIG. 17 is the amplitude alteration unit of the first embodiment shown in FIG. 4 whose current source is altered to a voltage source. As shown in FIG. 17, the pulse generator consist of the clock generator 101, the delay circuit 105, a square-wave pulse generation circuit 1506, and an amplitude control unit 1507 made up of voltage sources 1002 and MOS switches 1001. In the following example, an example whose delay circuits are of six stages is shown.

An output of the clock generator 101 is fed to the delay circuit 105, an output of the delay circuit 105 and the baseband signal are fed to the square-wave pulse generation circuit 1506, an output of the square-wave pulse generation circuit 1506 is fed to the amplitude control unit 1507, and an output of the pulse generator is outputted from the amplitude control unit 1507.

The clock generator 101 and the delay circuit 105 are the same as those of the first embodiment, and so their explanations are omitted.

Figure 18:
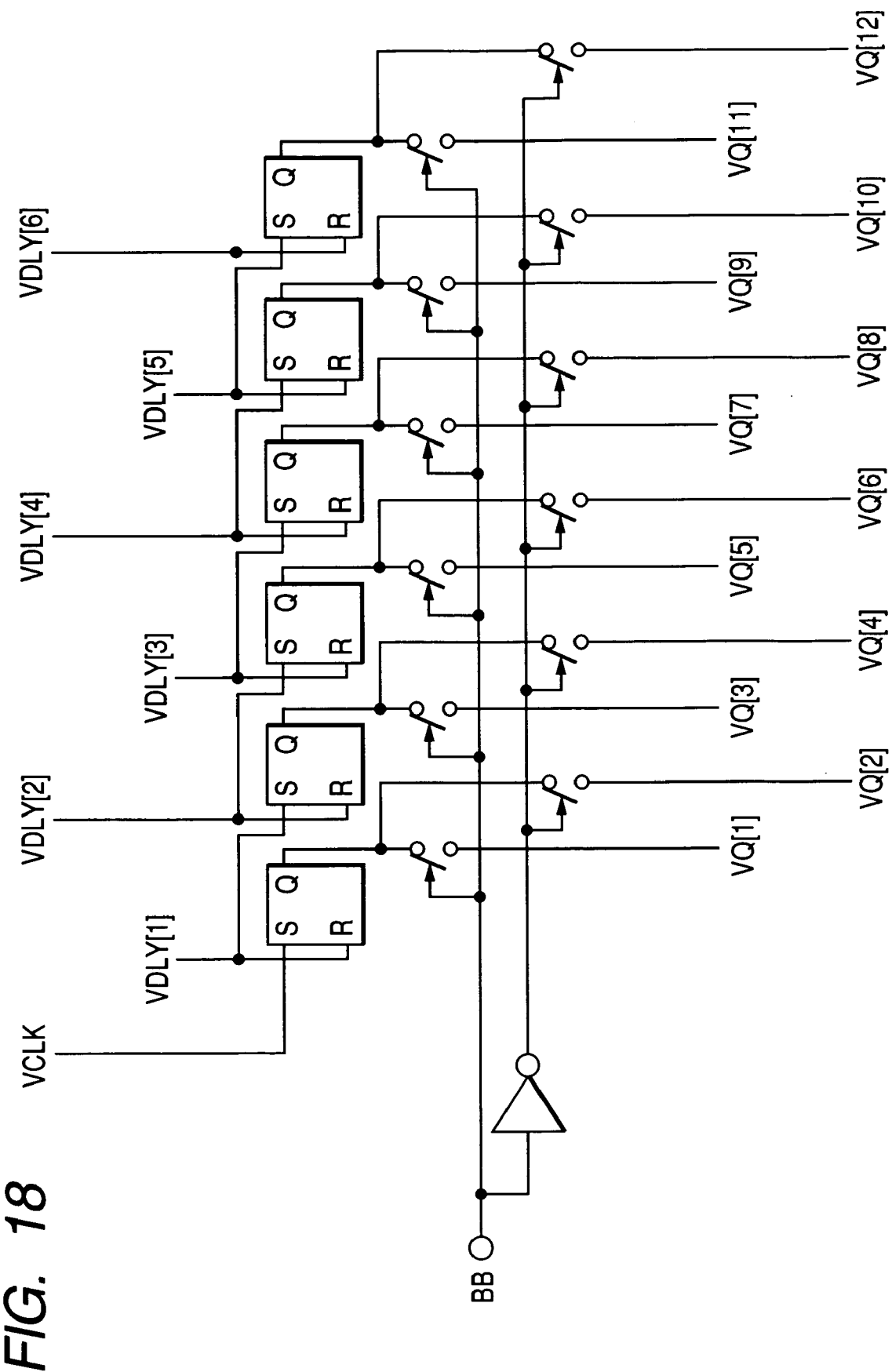
FIG. 18 is a block diagram of an amplitude control unit that is a sub-circuit in FIG. 17.
Figure 20:
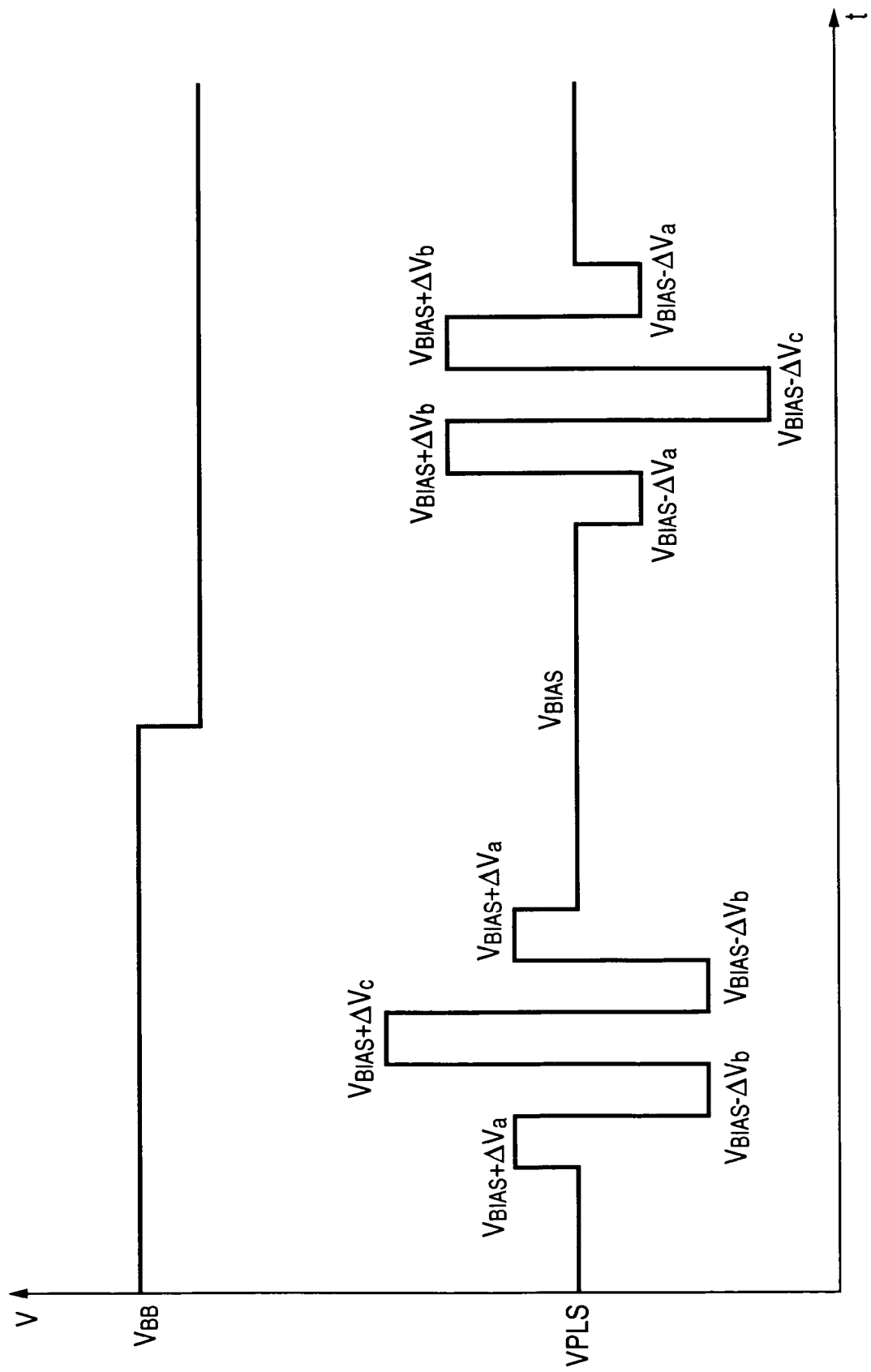
FIG. 20 is a diagram showing phase control of an output signal by the baseband signal in the pulse generation circuit according to the third embodiment of this invention.

FIG. 18 shows a block diagram of the square-wave pulse generation circuit 1506. In the following example, an example whose delay circuits are of six stages is shown. The square-wave pulse generation circuit 1506 is made up of SR flip-flop's and switches. The SR flip-flop receives an output of the delay circuit 105, detects the differential delay Td, and generates a square wave pulse having a pulse width equal to the differential delay Td. The switch is fed with the baseband signal and the square wave pulse, and determines an input source of the amplitude alteration unit. In the control with the baseband signal, variation of the baseband signal yields a signal whose phase is altered by 180° as shown in FIG. 20.

Figure 19:
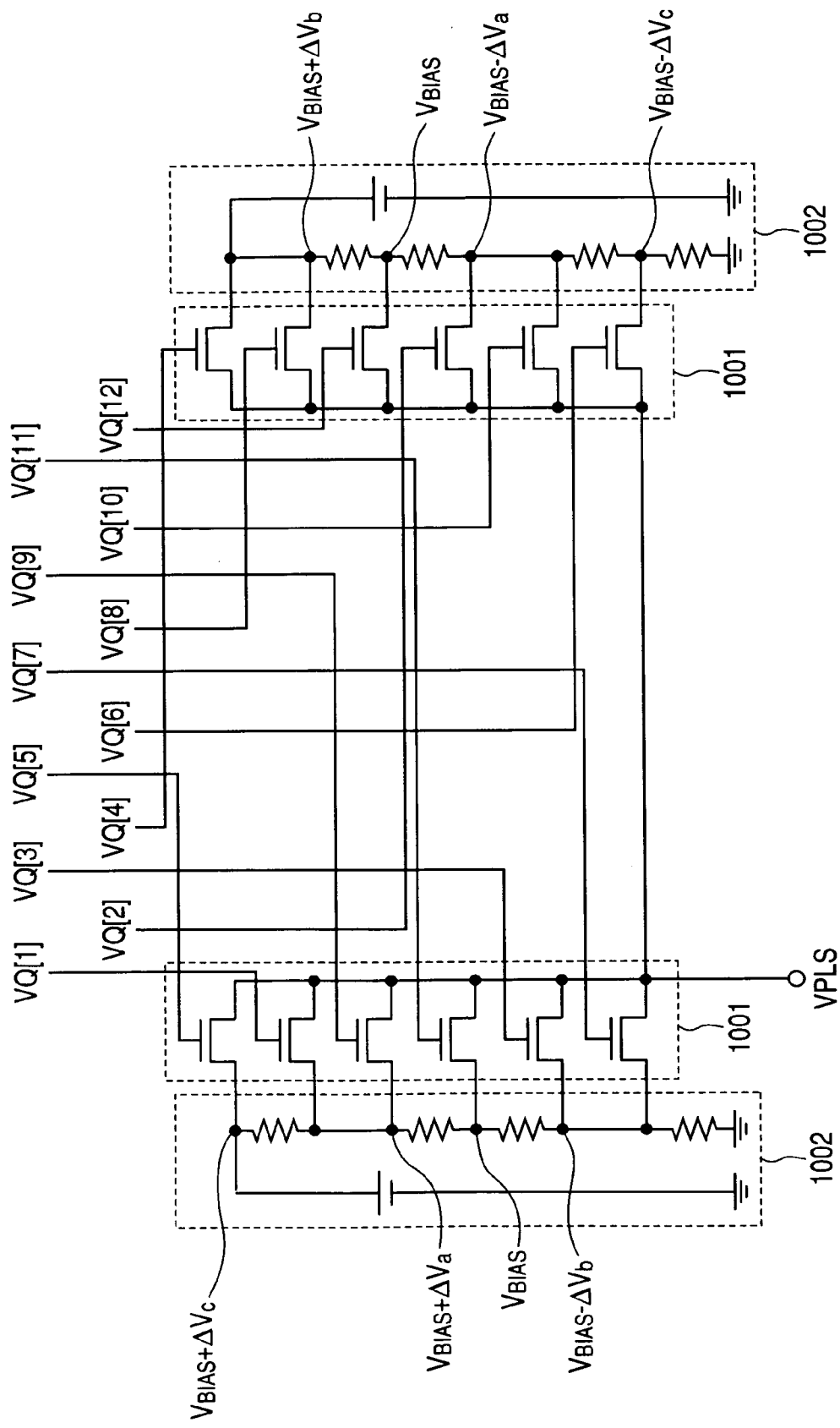
FIG. 19 is a block diagram of the amplitude control unit that is the sub-circuit in FIG. 17.

The amplitude control unit 1507 consists of a MOS switch and a voltage source, as shown in FIG. 19. When a square wave pulse is fed thereto from the square-wave pulse generation circuit 1506, the MOS switch turns conductive and transfers a voltage of the voltage source to its output. The voltage source has a plurality of voltages, for example, representing a reference voltage by Vbias in FIG. 19, having voltage sources whose voltages are Vbias+ΔVa, Vbias−ΔVa, Vbias+ΔVb, Vbias−ΔVb, Vbias+ΔVc, and Vbias−ΔVc, and one that is selected among them is transferred to the output through the MOS switch. Accordingly, when the baseband signal is High in FIG. 20, for example, the voltage source outputs a signal whose amplitude is controlled depending on a timing at which it is outputted.

According to this embodiment, the pulse generator used in the UWB-IR system etc. can be operated intermittently, thereby being able to realize lower power consumption. Moreover, since the LO signal is not used, the problem of LO leakage is not caused. Furthermore, there is flexibility also in the shape of generated pulses and the pulse generator has versatility that enables it to be used in various scenes.

Furthermore, according to this embodiment, there can be provided a pulse generator for UWB transmission that generates an output signal of a high-accuracy frequency characteristic, and a transmitter that uses it.

Furthermore, since the use of the voltage source for amplitude control makes it possible to fix the size of the NMOS switches 1001, there is an effect that, even when spurious capacity is varied by variation, the pulse generator is hard to be affected and can be miniaturized.

Fourth Embodiment

A fourth embodiment is an example in which lower power consumption is tried to be achieved by supplementing a device for controlling the power amplifier to the first embodiment.

Figure 21:
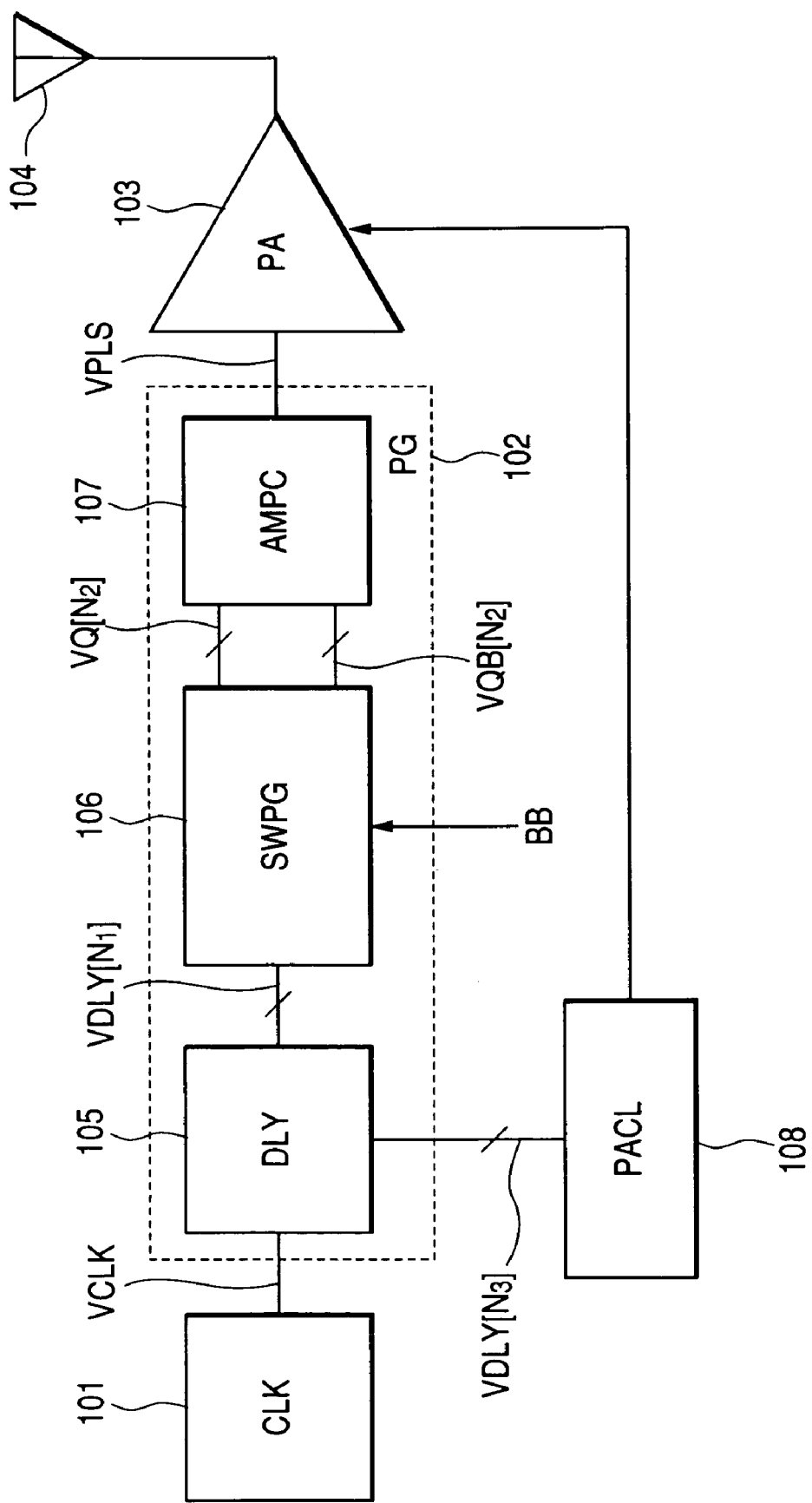
FIG. 21 is a diagram showing a transmitter using a pulse generator according to a fourth embodiment of this invention.

FIG. 21 shows a pulse generator according to a fourth embodiment. As shown in FIG. 21, a transmitter is constructed with: the pulse generators 102 that consists of the clock generator 101, the delay circuit 105, the square-wave pulse generation circuit 106, and the amplitude control unit 107; the power amplifier 103; the antenna 104; and a power amplifier control 108. The pulse generator 102 is of a configuration shown in the first, second, and third embodiments and has an extra addition of the power amplifier control 108. Accordingly, the power amplifier control 108 controls operations of the power amplifier 103 and, at the time of absence of a signal output, controls power to be fed to the power amplifier 103 so as to interrupt it.

The power amplifier control 108 receives a delay clock from the delay circuit 105, generates a timing at which power of the power amplifier 103 is interrupted using the delay clock, and interrupts the power of the power amplifier according to the interruption timing. As methods of interrupting the power, there exist control of the gate bias voltage of the power amplifier and control of the power supply voltage of the power amplifier.

According to this embodiment, the pulse generator used in the UWB-IR system etc. can be operated intermittently, thereby being able to realize lower power consumption. Moreover, since the LO signal is not used, the problem of LO leakage is not caused. Furthermore, there is flexibility also in the shape of generated pulses and the pulse generator has versatility that enables it to be used in various scenes.

Furthermore, according to this embodiment, there can be provided a pulse generator for UWB transmission that generates an output signal of a high-accuracy frequency characteristic, and a transmitter that uses it.

Further, it creates an effect that power of a power amplifier can be controlled by the pulse generator, and thereby lower power consumption can be achieved.

Fifth Embodiment

In a fifth embodiment, the amplitude control unit of the first embodiment is altered so as to have a circuit whose current source elements all have the same gate width and controls as to how many MOS switches are tuned ON for one input by controlling MOS switches each controlling an output current of the current source element in FIG. 7 in order to perform amplitude control.

Figure 22:
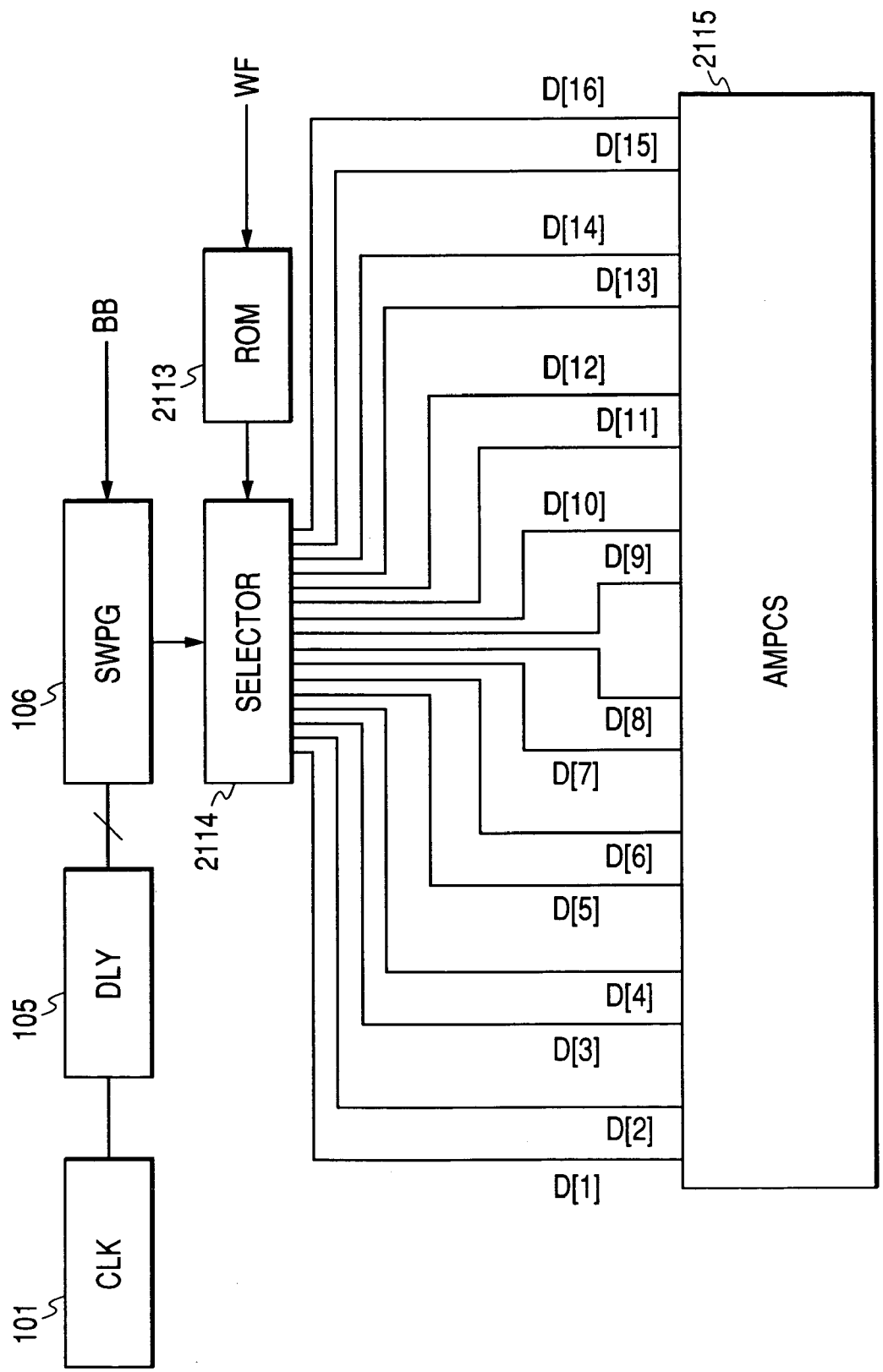
FIG. 22 is a diagram showing a transmitter using a pulse generator according to a fifth embodiment of this invention.

FIG. 22 shows a pulse generator that corresponds to the fifth embodiment. As shown in FIG. 22, the pulse generator is constructed with: the delay circuit 105 for generating a plurality of signals having different delay times; the square-wave pulse generation circuit 106 for outputting a plurality of square wave pulses each having a pulse width corresponding to the differential delay by controlling an output pattern based on the baseband signal; an amplitude control unit 2115 for generating a waveform having a different amplitude depending on an input of the square wave pulse; a selector 2114 for selecting a square wave pulse to be fed to the amplitude control unit; and a storage device 2113 for storing control patterns of the amplitude control unit that depend on pulse waveforms. In the following example, an example of the pulse generator with eight current source elements is shown.

Figure 23:
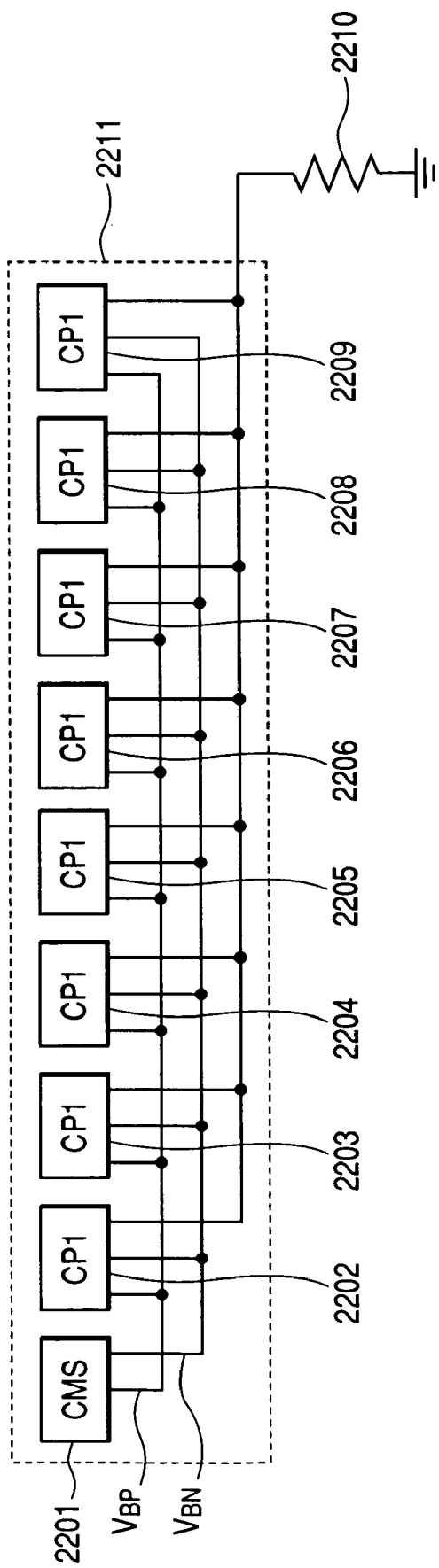
FIG. 23 is a block diagram of an amplitude control unit that is a sub-circuit in FIG. 22.
Figure 24:
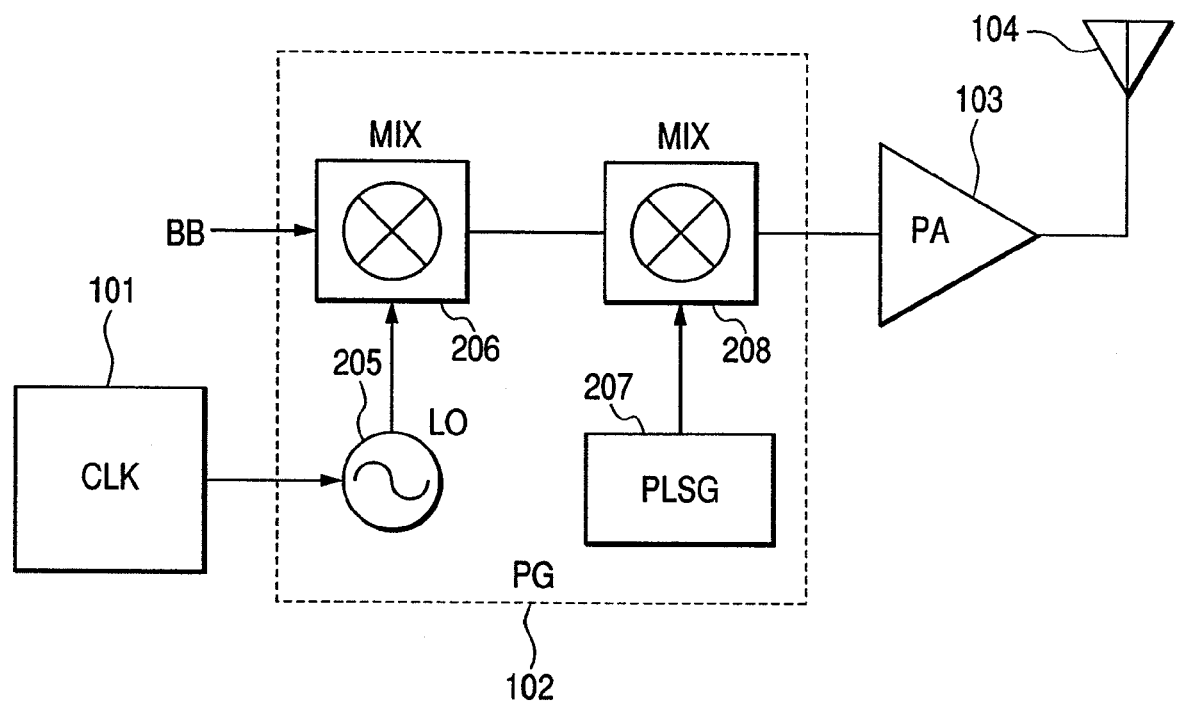
FIG. 24 is a diagram showing the conventional example.

Details of the amplitude control unit 2115 are as being shown in FIG. 23, consisting of a current source 2211 and a load 2210. Here, current source elements 2202-2209 are current source elements that output the same output current.

A code WF indicating a waveform is inputted into the storage device 2113 externally, which sends a control signal according to the waveform to the selector 2114. The selector 2114 selects the MOS switches 702, 703 to which an output of the square wave pulse generation circuit 106 is fed in response to a control signal fed from the storage device 2113 according to the waveform pattern. At this time, a selection method may be either selecting a MOS switch at random from the plurality of MOS switches 702, 703 or selecting a certain combination of the MOS switches 702, 703.

Then, the number of current sources to be operated and their combination is selected from among the current source elements 2202-2209 by the selector 2114, and the output of the square-wave pulse generation circuit 106 is fed to the selected current sources.

According to this embodiment, the pulse generator used in the UWB-IR system etc. can be operated intermittently, thereby being able to realize lower power consumption. Moreover, since the LO signal is not used, the problem of LO leakage is not caused. Furthermore, there is flexibility also in the shape of generated pulses and the pulse generator has versatility that enables it to be used in various scenes.

Furthermore, according to this embodiment, there can be provided a pulse generator for UWB transmission for generating an output of a high-accuracy frequency characteristic and a transmitter that uses it.

Furthermore, since an input source of the square wave pulse can be changed from among the current source elements having the same output current according to a pulse waveform, a pulse having an arbitrary waveform can be generated.

What is claimed is:

1. A pulse generator for a transmitter performing impulse communication, comprising:
a reference clock generation unit for generating a reference clock;
a delay unit equipped with a function of controlling a delay time and for generating a plurality of delayed signals having predetermined differential delays sequentially based on the reference clock;
a square-wave pulse generation unit that outputs a plurality of square wave pulses whose pulse widths correspond to the differential delays and whose phases are modulated by information being spread by a spread code based on the respective delayed signals; and
an amplitude control unit that assigns weights to the square wave pulses to convert them into a plurality of impulses and combines the impulses,
wherein the amplitude control unit has a plurality of current source transistors and switches for controlling the current source transistors, and
wherein the amplitude control unit is so configured as to control outputs of the current source transistors by inputs to the switches, connect output points of the switches with one another, and flow controlled output currents into the output points.

2. A pulse generator for a transmitter performing impulse communication, comprising:
a reference clock generation unit for generating a reference clock;
a delay unit equipped with a function of controlling a delay time and for generating a plurality of delayed signals having predetermined differential delays sequentially based on the reference clock;
a square-wave pulse generation unit that outputs a plurality of square wave pulses whose pulse widths correspond to the differential delays and whose phases are modulated by information being spread by a spread code based on the respective delayed signals; and
an amplitude control unit that assigns weights to the square wave pulses to convert them into a plurality of impulses and combines the impulses,
wherein the amplitude control unit has a plurality of current source transistors of the same size and switches for controlling the current source transistors, controls the switches by the square wave pulses depending on peak values of the output signals, and selects the number of the current source transistors connected to the output side.

3. The pulse generator according to claim 2,
wherein circuits each consisting of the current source transistor and the switch in the amplitude control unit are arranged in the same direction as a direction in which a reference clock transmits in the delay circuit and in the order of inputs of the square wave pulses.

4. The pulse generator according to claim 2,
wherein the amplitude control unit has circuits each consisting of a current source transistor and a switch, and the each circuit outputs a current only when a control signal is being fed to the switch of the circuit.

5. The pulse generator according to claim 2,
wherein circuits each consisting of a current source transistor and a switch in the amplitude control unit is made up of pairs of two kinds of circuits whose output currents are different in flow direction and equal in output current value in the absolute sense.

6. The pulse generator according to claim 2,
wherein the amplitude control unit has current source transistors and switches, and controls the switch so as to output a current whose polarity is inverted to an output current earlier than the current time by a delay time.

7. The pulse generator according to claim 2,
wherein the amplitude control unit has current source transistors, switches, a device that stores an on-off control pattern of the switch that corresponds to a waveform, and a selector, and is equipped with a function of allowing the selector to select a combination of switched that are to be turned ON or OFF according to an instruction of a waveform fed to the device from outside.

* * * * *